US008572676B2

(12) United States Patent
Sapp et al.

(10) Patent No.: US 8,572,676 B2
(45) Date of Patent: Oct. 29, 2013

(54) SYSTEM, METHOD, AND DEVICE FOR MEDIATING CONNECTIONS BETWEEN POLICY SOURCE SERVERS, CORPORATE REPOSITORIES, AND MOBILE DEVICES

(75) Inventors: Kevin Sapp, Washington, DC (US); David Goldschlag, Silver Spring, MD (US); David Walker, Leesburg, VA (US)

(73) Assignee: McAfee, Inc., Santa Clara, CA (US)

( * ) Notice: Subject to any disclaimer, the term of this patent is extended or adjusted under 35 U.S.C. 154(b) by 383 days.

(21) Appl. No.: 12/614,333

(22) Filed: Nov. 6, 2009

(65) Prior Publication Data

US 2010/0115582 A1    May 6, 2010

Related U.S. Application Data

(60) Provisional application No. 61/111,762, filed on Nov. 6, 2008, provisional application No. 61/252,350, filed on Oct. 16, 2009.

(51) Int. Cl.
*H04L 29/06* (2006.01)

(52) U.S. Cl.
USPC ............................................................ 726/1

(58) Field of Classification Search
USPC ............................................................ 726/1
See application file for complete search history.

(56) References Cited

U.S. PATENT DOCUMENTS

| 5,727,202 A | 3/1998 | Kucala |
| 5,884,323 A | 3/1999 | Hawkins et al. |
| 5,987,610 A | 11/1999 | Franczek et al. |
| 6,000,000 A | 12/1999 | Hawkins et al. |
| 6,006,274 A | 12/1999 | Hawkins et al. |
| 6,073,142 A | 6/2000 | Geiger et al. |
| 6,158,010 A | 12/2000 | Moriconi et al. |
| 6,301,484 B1 * | 10/2001 | Rogers et al. ............... 455/466 |

(Continued)

FOREIGN PATENT DOCUMENTS

| AU | 2003260071 | 3/2004 |
| EP | 0661677 | 7/1995 |

(Continued)

OTHER PUBLICATIONS

International Search Report and Written Opinion for International Application No. PCT/US2009/063640 mailed Apr. 20, 2010 (6 pages).

(Continued)

*Primary Examiner* — David García Cervetti
(74) *Attorney, Agent, or Firm* — Patent Capital Group

(57) ABSTRACT

The invention relates to providing policy from an integrated policy server to a mobile device, comprising identifying a policy in an integrated policy server applicable to the mobile device and supplying policy elements to policy transports for transmission to the mobile device. The invention also relates to providing policy from an integrated policy server to a mobile device, including identifying a policy in the integrated policy server applicable to the mobile device, determining whether the mobile device is in compliance with the policy, and supplying policy elements to policy transports for transmission to the mobile device when the mobile device is not in compliance with the policy. The invention further relates to controlling access to a data server by a mobile device, including identifying a policy in an integrated policy server applicable to the mobile device, and determining whether the mobile device is in compliance with the policy.

21 Claims, 10 Drawing Sheets

(56) References Cited

U.S. PATENT DOCUMENTS

| | | |
|---|---|---|
| 6,317,868 B1 | 11/2001 | Grimm et al. |
| 6,460,050 B1 | 10/2002 | Pace et al. |
| 6,661,780 B2 * | 12/2003 | Li .................................. 370/324 |
| 6,678,827 B1 | 1/2004 | Rothermel |
| 6,684,244 B1 * | 1/2004 | Goldman et al. .............. 709/223 |
| 6,694,434 B1 | 2/2004 | McGee et al. |
| 6,766,165 B2 | 7/2004 | Sharma et al. |
| 6,798,757 B2 * | 9/2004 | Mizutani et al. .............. 370/329 |
| 6,804,722 B1 * | 10/2004 | Nishi ............................. 709/234 |
| 6,839,766 B1 * | 1/2005 | Parnafes et al. .............. 709/232 |
| 6,944,183 B1 * | 9/2005 | Iyer et al. ...................... 370/466 |
| 6,954,790 B2 | 10/2005 | Forslow |
| 6,973,488 B1 * | 12/2005 | Yavatkar et al. .............. 709/223 |
| 7,003,562 B2 * | 2/2006 | Mayer ........................... 709/223 |
| 7,089,592 B2 | 8/2006 | Adjaoute |
| 7,103,772 B2 | 9/2006 | Jorgensen et al. |
| 7,136,645 B2 | 11/2006 | Hanson et al. |
| 7,136,907 B1 | 11/2006 | Nordstrom et al. |
| 7,194,689 B2 | 3/2007 | Manni et al. |
| 7,222,359 B2 | 5/2007 | Freund et al. |
| 7,249,369 B2 | 7/2007 | Knouse et al. |
| 7,308,703 B2 | 12/2007 | Wright et al. |
| 7,317,699 B2 * | 1/2008 | Godfrey et al. ............... 370/328 |
| 7,346,340 B2 * | 3/2008 | Purnadi et al. ............. 455/414.1 |
| 7,386,888 B2 | 6/2008 | Liang et al. |
| 7,428,583 B1 * | 9/2008 | Lortz et al. .................... 709/223 |
| 7,448,067 B2 * | 11/2008 | Yadav .............................. 726/1 |
| 7,506,155 B1 | 3/2009 | Stewart et al. |
| 7,546,629 B2 | 6/2009 | Albert et al. |
| 7,562,388 B2 | 7/2009 | Hackenberger et al. |
| 7,574,208 B2 | 8/2009 | Hanson et al. |
| 7,665,118 B2 | 2/2010 | Mann et al. |
| 7,669,237 B2 | 2/2010 | Shahbazi |
| 7,734,284 B2 | 6/2010 | Adams et al. |
| 7,774,363 B2 * | 8/2010 | Lim ................................ 707/781 |
| 7,774,504 B2 * | 8/2010 | Chene et al. ................... 709/246 |
| 7,853,998 B2 * | 12/2010 | Blaisdell et al. ................. 726/12 |
| 7,865,938 B2 | 1/2011 | Shahbazi |
| 7,971,232 B2 * | 6/2011 | Hasbun ............................ 726/2 |
| 8,010,997 B2 * | 8/2011 | Limont et al. .................... 726/3 |
| 8,131,851 B2 * | 3/2012 | Harlow ........................... 709/224 |
| 8,134,954 B2 * | 3/2012 | Godfrey et al. ............... 370/328 |
| 8,259,568 B2 | 9/2012 | Laudermilch et al. |
| 8,259,611 B2 * | 9/2012 | Godfrey et al. ............... 370/252 |
| 8,341,693 B2 * | 12/2012 | Shahbazi .......................... 726/1 |
| 2001/0039624 A1 | 11/2001 | Kellum |
| 2001/0041576 A1 | 11/2001 | I'Anson et al. |
| 2002/0027569 A1 | 3/2002 | Manni et al. |
| 2002/0032853 A1 | 3/2002 | Preston et al. |
| 2002/0068559 A1 | 6/2002 | Sharma et al. |
| 2002/0098830 A1 | 7/2002 | Lauper et al. |
| 2002/0098840 A1 | 7/2002 | Hanson et al. |
| 2002/0120599 A1 | 8/2002 | Knouse et al. |
| 2002/0184532 A1 | 12/2002 | Hackenberger et al. |
| 2002/0194317 A1 * | 12/2002 | Kanada et al. ................. 709/223 |
| 2003/0028651 A1 | 2/2003 | Schreckengast et al. |
| 2003/0037129 A1 * | 2/2003 | Beadles et al. ................ 709/220 |
| 2003/0081621 A1 * | 5/2003 | Godfrey et al. ............... 370/400 |
| 2003/0108015 A1 * | 6/2003 | Li .................................. 370/338 |
| 2003/0130953 A1 | 7/2003 | Narasimhan et al. |
| 2003/0140246 A1 | 7/2003 | Kammer et al. |
| 2003/0162555 A1 | 8/2003 | Loveland |
| 2003/0167405 A1 | 9/2003 | Freund et al. |
| 2003/0177389 A1 * | 9/2003 | Albert et al. ................... 713/201 |
| 2003/0182394 A1 | 9/2003 | Ryngler et al. |
| 2003/0228866 A1 | 12/2003 | Pezeshki |
| 2004/0009768 A1 | 1/2004 | Waters et al. |
| 2004/0022258 A1 | 2/2004 | Tsukada et al. |
| 2004/0030705 A1 | 2/2004 | Bowman-Amuah |
| 2004/0030796 A1 * | 2/2004 | Cooper et al. ................. 709/231 |
| 2004/0043762 A1 | 3/2004 | Kim et al. |
| 2004/0064727 A1 * | 4/2004 | Yadav ............................. 713/201 |
| 2004/0076128 A1 | 4/2004 | Rao et al. |
| 2004/0083382 A1 | 4/2004 | Markham et al. |
| 2004/0123150 A1 | 6/2004 | Wright et al. |
| 2004/0128394 A1 | 7/2004 | Knauerhase et al. |
| 2004/0179690 A1 | 9/2004 | Soliman |
| 2004/0214570 A1 | 10/2004 | Zhang et al. |
| 2004/0225524 A1 | 11/2004 | Narasimhan et al. |
| 2004/0266395 A1 | 12/2004 | Pailles et al. |
| 2004/0268145 A1 | 12/2004 | Watkins et al. |
| 2005/0022012 A1 | 1/2005 | Bluestone et al. |
| 2005/0055578 A1 | 3/2005 | Wright et al. |
| 2005/0060393 A1 * | 3/2005 | Parnafes et al. ............... 709/220 |
| 2005/0097199 A1 | 5/2005 | Woodard et al. |
| 2005/0101293 A1 | 5/2005 | Mentze et al. |
| 2005/0135375 A1 | 6/2005 | Hurtta et al. |
| 2005/0164691 A1 * | 7/2005 | Payne ............................ 455/419 |
| 2005/0198306 A1 | 9/2005 | Palojarvi et al. |
| 2005/0203881 A1 | 9/2005 | Sakamoto et al. |
| 2005/0251853 A1 * | 11/2005 | Bhargavan et al. ............... 726/1 |
| 2005/0254652 A1 | 11/2005 | Engler et al. |
| 2005/0255838 A1 | 11/2005 | Adams et al. |
| 2005/0257246 A1 | 11/2005 | Adams et al. |
| 2005/0262343 A1 | 11/2005 | Jorgensen et al. |
| 2005/0268326 A1 * | 12/2005 | Bhargavan et al. ............... 726/1 |
| 2006/0005254 A1 | 1/2006 | Ross |
| 2006/0031351 A1 * | 2/2006 | Marston et al. ................ 709/206 |
| 2006/0036730 A1 | 2/2006 | Graham et al. |
| 2006/0075472 A1 | 4/2006 | Sanda et al. |
| 2006/0089938 A1 | 4/2006 | Leonard et al. |
| 2006/0095953 A1 | 5/2006 | Frank |
| 2006/0112427 A1 | 5/2006 | Shahbazi |
| 2006/0130139 A1 | 6/2006 | Sobel et al. |
| 2006/0141995 A1 * | 6/2006 | Purnadi et al. ............. 455/414.1 |
| 2006/0161646 A1 * | 7/2006 | Chene et al. ................... 709/223 |
| 2006/0184490 A1 * | 8/2006 | Heim et al. ...................... 706/46 |
| 2006/0190684 A1 * | 8/2006 | McCammon et al. ........ 711/117 |
| 2006/0190984 A1 | 8/2006 | Heard et al. |
| 2006/0224742 A1 | 10/2006 | Shahbazi ........................ 709/226 |
| 2006/0277590 A1 * | 12/2006 | Limont et al. .................... 726/1 |
| 2007/0006289 A1 * | 1/2007 | Limont et al. .................... 726/6 |
| 2007/0088948 A1 * | 4/2007 | Ji et al. ........................... 713/166 |
| 2007/0143824 A1 | 6/2007 | Shahbazi |
| 2007/0156670 A1 * | 7/2007 | Lim ................................. 707/4 |
| 2007/0156694 A1 * | 7/2007 | Lim ................................. 707/9 |
| 2007/0157287 A1 * | 7/2007 | Lim ................................. 726/1 |
| 2007/0157288 A1 * | 7/2007 | Lim ................................. 726/1 |
| 2007/0169168 A1 * | 7/2007 | Lim ................................. 726/1 |
| 2007/0186275 A1 | 8/2007 | Shahbazi |
| 2007/0266422 A1 * | 11/2007 | Germano et al. .................. 726/1 |
| 2008/0034401 A1 * | 2/2008 | Wang .............................. 726/1 |
| 2008/0052383 A1 * | 2/2008 | O'Shaughnessy et al. ... 709/223 |
| 2008/0065700 A1 * | 3/2008 | Lim ............................... 707/200 |
| 2008/0066149 A1 * | 3/2008 | Lim ................................. 726/1 |
| 2008/0070495 A1 * | 3/2008 | Stricklen et al. ............. 455/3.01 |
| 2008/0098062 A1 | 4/2008 | Balia ............................. 709/203 |
| 2008/0125102 A1 * | 5/2008 | Abel et al. ..................... 455/418 |
| 2008/0137593 A1 | 6/2008 | Laudermilch et al. |
| 2008/0184200 A1 * | 7/2008 | Burns et al. ................... 717/121 |
| 2008/0184201 A1 * | 7/2008 | Burns et al. ................... 717/121 |
| 2008/0184277 A1 * | 7/2008 | Burns et al. ................... 719/327 |
| 2008/0209505 A1 * | 8/2008 | Ghai et al. ........................ 726/1 |
| 2009/0049166 A1 * | 2/2009 | Roman et al. ................. 709/223 |
| 2009/0049518 A1 * | 2/2009 | Roman et al. .................... 726/1 |
| 2009/0138939 A1 * | 5/2009 | Kumar et al. ..................... 726/1 |
| 2009/0164560 A1 * | 6/2009 | Fiatal ............................ 709/203 |
| 2009/0265754 A1 * | 10/2009 | Hinds ............................... 726/1 |
| 2009/0298478 A1 * | 12/2009 | Tyhurst et al. .............. 455/414.1 |
| 2009/0322890 A1 * | 12/2009 | Bocking et al. ............. 348/211.2 |
| 2010/0037088 A1 * | 2/2010 | Krivopaltsev et al. ............ 714/4 |
| 2010/0064341 A1 * | 3/2010 | Aldera ............................. 726/1 |
| 2010/0112983 A1 | 5/2010 | Walker et al. |
| 2010/0115581 A1 | 5/2010 | Goldschlag et al. |
| 2010/0154025 A1 | 6/2010 | Balducci et al. |
| 2010/0191847 A1 * | 7/2010 | Raleigh ......................... 709/224 |
| 2011/0004913 A1 | 1/2011 | Nagarajan et al. |
| 2011/0162049 A1 | 6/2011 | Shahbazi |
| 2011/0167470 A1 | 7/2011 | Walker et al. |
| 2011/0276683 A1 | 11/2011 | Goldschlag et al. |
| 2011/0320819 A1 * | 12/2011 | Weber et al. .................. 713/176 |
| 2012/0270522 A1 | 10/2012 | Laudermilch et al. |

(56) References Cited

U.S. PATENT DOCUMENTS

| | | | |
|---|---|---|---|
| 2012/0270523 | A1 | 10/2012 | Laudermilch et al. |
| 2013/0047219 | A1* | 2/2013 | Shahbazi .................. 726/4 |

FOREIGN PATENT DOCUMENTS

| | | |
|---|---|---|
| EP | 1041506 | 10/2000 |
| EP | 1540446 | 6/2005 |
| EP | 1709556 | 7/2005 |
| EP | 1866789 | 12/2007 |
| EP | 2345205 | 7/2011 |
| GB | 1 496 984 A | 12/1975 |
| WO | WO 02/19116 | 3/2002 |
| WO | WO 02/44892 | 6/2002 |
| WO | WO 03/027878 | 4/2003 |
| WO | WO 03/090492 A1 | 10/2003 |
| WO | WO 2004/021114 A2 | 3/2004 |
| WO | WO 2004/057834 | 7/2004 |
| WO | WO 2005/064498 A1 | 7/2005 |
| WO | WO 2005/107144 A1 | 11/2005 |
| WO | WO 2006/093917 A2 | 9/2006 |
| WO | WO 2007/073278 A2 | 6/2007 |
| WO | WO 2008/109866 | 9/2008 |
| WO | WO 2010/054258 A1 | 5/2010 |

OTHER PUBLICATIONS

U.S. Appl. No. 12/972,410, filed Dec. 17, 2010, entitled "Enterprise-Wide Security System for Computer Devices," Inventor Majid Shahbazi.
USPTO Aug. 6, 2010 Nonfinal Office Action from U.S. Appl. No. 11/877,656.
USPTO Nov. 8, 2010 Response to Aug. 6, 2010 Nonfinal Office Action from U.S. Appl. No. 11/877,656.
USPTO Mar. 1, 2011 Final Office Action from U.S. Appl. No. 11/877,656.
USPTO Jun. 1, 2011 RCE Response to Mar. 1, 2011 Final Office Action from U.S. Appl. No. 11/877,656.
USPTO Jun. 2, 2009 Nonfinal Office Action from U.S. Appl. No. 11/363,283.
USPTO Oct. 2, 2009 Response to Jun. 2, 2009 Nonfinal Office Action from U.S. Appl. No. 11/363,283.
USPTO Jan. 5, 2010 Final Office Action from U.S. Appl. No. 11/363,283.
USPTO Jul. 6, 2010 RCE Response to Jan. 5, 2010 Final Office Action from U.S. Appl. No. 11/363,283.
USPTO Sep. 23, 2010 Office Action from U.S. Appl. No. 11/363,283.
USPTO Dec. 12, 2010 Response to Sep. 23, 2010 Nonfinal Office Action from U.S. Appl. No. 11/363,283.
USPTO Mar. 9, 2011 Final Office Action from U.S. Appl. No. 11/363,283.
USPTO Sep. 16, 2010 Nonfinal Office Action from U.S. Appl. No. 11/578,420.
USPTO Dec. 16, 2010 Response to Sep. 16, 2010 Nonfinal Office Action from U.S. Appl. No. 11/578,420.
USPTO Mar. 4, 2011 Final Office Action from U.S. Appl. No. 11/578,420.
Smith, Randy F., "Tracking Logon and Logoff Activity in Windows 2000", Feb. 2001, Microsoft TechNet, http://www.microsoft.com/technet/prodtechnol/windows2000serv/maintain/monitor/logonoff.mspx (printed Jul. 1, 2010, © 2010).
International Search Report for International Application No. PCT/US03/26645 mailed Feb. 13, 2004 (3 pages).
International Preliminary Examination Report for International Application No. PCT/US03/26645 completed Mar. 3, 2005 (6 pages).
International Preliminary Examination Report for International Application No. PCT/US04/42565 mailed Jul. 17, 2006 (7 pages).
Written Opinion of the International Searching Authority for International Application No. PCT/US04/42565 mailed May 25, 2005 (6 pages).
International Search Report for International Application No. PCT/US04/42565 mailed May 25, 2005 (1 page).
"Face-Image Capturing Method for Unattended Terminal", IBM Technical Disclosure Bulletin, IBM Corporation, NewYork, US, vol. 38, No. 1, Jan. 1995, pp. 101-102, XP000498703 ISSN: 0018-8689.
International Search Report for International Application No. PCT/US06/06968 mailed Feb. 29, 2008 (1 page).
International Preliminary Report on Patentability issued Mar. 24, 2009 (1 page) and Written Opinion of the International Searching Authority mailed Feb. 29, 2008 (4 pages) for International Application No. PCT/US06/06968.
International Search Report for International Application No. PCT/US2009/063640 mailed Apr. 20, 2010 (6 pages).
Supplementary European Search Report for EPO Application No. EP 04 81 4713 completed Apr. 25, 2007.
Request for Continued Examination and Amendment in U.S. Appl. No. 11/363,283, filed Apr. 29, 2012.
Notice of Allowance in U.S. Appl. No. 11/877,656 mailed on Mar. 29, 2012.
U.S. Appl. No. 13/459,213, filed Apr. 29, 2012, entitled "System and Method for Controlling Mobile Device Access to a Network"; inventors Norm Laudermilch et al.
U.S. Appl. No. 13/459,216, filed Apr. 29, 2012, entitled "System and Method for Controlling Mobile Device Access to a Network"; inventors Norm Laudermilch et al.
Non-Final Office Action in U.S. Appl. No. 12/614,319 mailed on Apr. 19, 2012.
Final Office Action in U.S. Appl. No. 12/614,326 mailed on May 10, 2012.
Request for Continued Examination and Amendment in U.S. Appl. No. 11/441,049, filed Aug. 14, 2012.
Request for Continued Examination and Amendment in U.S. Appl. No. 12/972,410, filed Jun. 7, 2012.
Notice of Allowance in U.S. Appl. No. 12/972,410 mailed on Jun. 25, 2012.
Request for Continued Examination in U.S. Appl. No. 12/972,410, filed Sep. 23, 2012.
Notice of Allowance in U.S. Appl. No. 12/972,410 mailed on Oct. 17, 2012.
U.S. Appl. No. 13/630,830, filed Sep. 28, 2012 entitled "Enterprise-Wide Security System for Computer Devices", Inventor, Majid Shahbazi.
Final Office Action in U.S. Appl. No. 11/578,420 mailed on May 14, 2012.
Request for Continued Examination and Amendment in U.S. Appl. No. 11/578,420, filed Aug. 14, 2012.
Notice of Allowance in U.S. Appl. No. 11/578,420 mailed on Sep. 26, 2012.
Request for Continued Examination in U.S. Appl. No. 11/877,656, filed Jun. 29, 2012.
Notice of Allowance in U.S. Appl. No. 11/877,656 mailed on Jul. 20, 2012.
Response to Non-Final Office Action dated Apr. 19, 2012 in U.S. Appl. No. 12/614,319, filed Jun. 22, 2012.
Final Office Action in U.S. Appl. No. 12/614,319 mailed on Sep. 20, 2012.
Request for Continued Examination and Amendment in U.S. Appl. No. 12/614,326, filed Aug. 10, 2012.
Non-Final Office Action in U.S. Appl. No. 12/830,861 mailed on Jun. 21, 2012.
"Can You Manage an iPhone Like a BlackBerry?", Network World Middle East, Copyright IDG Middle East, Jul. 9, 2009 (3 pages).
"GuardianEdge Releases Smartphone Protection Product", ComputerTechnology Review, Nov. 28, 2007 (1 page).
PCT Written Opinion in International Application Serial No. PCT/US03/26645 mailed on Jan. 21, 2005 (7 Pages).
EPO Replacement International Search Report for EP Application No. 04814713.6-1238/1709556 mailed on May 30, 2011.
European Patent Office Communication Pursuant to Article 94(3) EPC (Examination Report) dated Sep. 29, 2011 in EP Application No. 04814713.6.

(56) References Cited

OTHER PUBLICATIONS

International Preliminary Report on Patentability and Written Opinion for International Application No. PCT/US2009/063640 mailed on May 19, 2011 (10 pages).
European Patent Office Communication Pursuant to Rules 161(1) and 162 EPC in EP Application No. 09759830.4-1244 mailed on Jun. 15, 2011.
Non-Final Office Action in U.S. Appl. No. 10/527,235 mailed on Jun. 28, 2006.
Response to Non-Final Office Action dated Jun. 28, 2006 in U.S. Appl. No. 10/527,235, filed Sep. 28, 2006.
Final Office Action in U.S. Appl. No. 10/527,235 mailed on Dec. 12, 2006.
Request for Continued Examination and Amendment in U.S. Appl. No. 10/527,235, filed Jun. 12, 2007.
Non-Final Office Action in U.S. Appl. No. 10/527,235 mailed on Aug. 28, 2007.
Response to Non-Final Office Action dated Aug. 28, 2007 in U.S. Appl. No. 10/527,235, filed Feb. 28, 2008.
Final Office Action in U.S. Appl. No. 10/527,235 mailed on Jul. 11, 2008.
Request for Continued Examination and Amendment in U.S. Appl. No. 10/527,235, filed Dec. 11, 2008.
Non-Final Office Action in U.S. Appl. No. 10/527,235 mailed on Jan. 9, 2009.
Response to Non-Final Office Action dated Jan. 9, 2009 in U.S. Appl. No. 10/527,235, filed Jul. 9, 2009.
Notice of Allowance in U.S. Appl. No. 10/527,235 mailed on Oct. 5, 2009.
Non-Final Office Action in U.S. Appl. No. 11/441,049 mailed on Oct. 17, 2006.
Response to Non-Final Office Action dated Oct. 17, 2006 in U.S. Appl. No. 11/441,049, filed Jan. 17, 2007.
Final Office Action in U.S. Appl. No. 11/441,049 mailed on Mar. 22, 2007.
Request for Continued Examination and Amendment in U.S. Appl. No. 11/441,049, filed Jun. 22, 2007.
Non-Final Office Action in U.S. Appl. No. 11/441,049 mailed on Sep. 24, 2007.
Response to Non-Final Office Action dated Sep. 24, 2007 in U.S. Appl. No. 11/441,049, filed Mar. 24, 2008.
Final Office Action in U.S. Appl. No. 11/441,049 mailed on Jul. 9, 2008.
Request for Continued Examination and Amendment in U.S. Appl. No. 11/441,049, filed Jan. 9, 2009.
Non-Final Office Action in U.S. Appl. No. 11/441,049 mailed on Feb. 2, 2009.
Examiner Interview Summary in U.S. Appl. No. 11/441,049 mailed on Jul. 27, 2009.
Response to Non-Final Office Action dated Feb. 2, 2009 in U.S. Appl. No. 11/441,049, filed Aug. 27, 2009.
Non-Final Office Action in U.S. Appl. No. 11/441,049 mailed on Dec. 10, 2009.
Response to Non-Final Office Action dated Dec. 10, 2009 in U.S. Appl. No. 11/441,049, filed Jun. 10, 2010.
Examiner Interview Summary in U.S. Appl. No. 11/441,049 mailed on Jun. 14, 2010.
Notice of Allowance in U.S. Appl. No. 11/441,049 mailed on Aug. 23, 2010.
Non-Final Office Action in U.S. Appl. No. 12/972,410 mailed on Sep. 21, 2011.
Response to Non-Final Office Action in U.S. Appl. No. 12/972,410, filed Dec. 21, 2011.
Final Office Action in U.S. Appl. No. 12/972,410 mailed on Mar. 7, 2012.
Request for Continued Examination and Amendment in U.S. Appl. No. 11/578,420, filed Jun. 6, 2011.
Non-Final Office Action and Examiner Interview Summary in U.S. Appl. No. 11/578,420 mailed on Jun. 22, 2011.
Response to Non-Final Office Action dated Jun. 22, 2011 in U.S. Appl. No. 11/578,420, filed Sep. 21, 2011.
Non-Final Office Action in U.S. Appl. No. 11/578,420 mailed on Dec. 1, 2011.
Response to Non-Final Office Action dated Dec. 1, 2011 in U.S. Appl. No. 11/578,420, filed Mar. 1, 2012.
Requested for Continued Examination and Amendment in U.S. Appl. No. 11/363,283, filed Jun. 9, 2011.
Non-Final Office Action in U.S. Appl. No. 11/363,283 mailed on Aug. 17, 2011.
Response to Non-Final Office Action dated Aug. 17, 2011 in U.S. Appl. No. 11/363,283, filed Nov. 17, 2011.
Final Office Action in U.S. Appl. No. 11/363,283 mailed on Jan. 30, 2012.
Notice of Allowance in U.S. Appl. No. 11/877,656 mailed on Jul. 12, 2011.
Request for Continued Examination and Amendment in U.S. Appl. No. 11/877,656, filed Sep. 22, 2011.
Notice of Allowance in U.S. Appl. No. 11/877,656 mailed on Oct. 5, 2011.
Request for Continued Examination in U.S. Appl. No. 11/877,656, filed Jan. 4, 2012.
Notice of Allowance in U.S. Appl. No. 11/877,656 mailed on Jan. 24, 2012.
Request for Continued Examination in U.S. Appl. No. 11/877,656, filed Mar. 14, 2012.
Non-Final Office Action in U.S. Appl. No. 12/614,326 mailed on Dec. 16, 2011.
Response to Non-Final Office Action in U.S. Appl. No. 12/614,326, filed Mar. 16, 2012.
U.S. Appl. No. 12/830,861, filed Jul. 6, 2010 and entitled "Mobile Data Security System and Methods".
U.S. Appl. No. 13/102,627, filed May 6, 2011 and entitled "Distributed Data Revocation Using Data Commands".
Nayak, et al., "Security Issues in Mobile Data Networks," Vehicular Technology Conference, 2004; VTC2004-Fall 2004; IEEE 60th., vol. 5, pp. 3229-3233.
Request for Continued Examination in U.S. Appl. No. 11/578,420 filed Dec. 21, 2012.
Notice of Allowance in U.S. Appl. No. 11/578,420 mailed on Jan. 18, 2013.
Request for Continued Examination and Amendment in U.S. Appl. No. 11/578,420 filed Apr. 18, 2013.
Notice of Allowance in U.S. Appl. No. 11/363,283 mailed Jan. 7, 2013.
Request for Continued Examination in U.S. Appl. No. 11/363,283 filed Apr. 8, 2013.
Notice of Allowance in U.S. Appl. No. 11/363,283 mailed on May 24, 2013.
Non-Final Office Action in U.S. Appl. No. 13/459,213 mailed on Dec. 17, 2012.
Response to Non-Final Office Action dated Dec. 17, 2012 in U.S. Appl. No. 13/459,213 filed Mar. 18, 2013.
Non-Final Office Action in U.S. Appl. No. 13/459,216 mailed on Dec. 7, 2012.
Response to Non-Final Office Action dated Dec. 7, 2012 in U.S. Appl. No. 13/459,216 filed Mar. 7, 2013.
Final Office Action in U.S. Appl. No. 13/459,216 mailed on Mar. 26, 2013.
Request for Continued Examination and Amendment in U.S. Appl. No. 12/614,319 filed Nov. 28, 2012.
Non-Final Office Action in U.S. Appl. No. 12/614,319 mailed on Feb. 7, 2013.
Response to Non-Final Office Action dated Jul. 2, 2013 in U.S. Appl. No. 12/614,319 filed May 7, 2013.
Non-Final Office Action in U.S. Appl. No. 12/614,326 mailed on Dec. 12, 2012.
Response to Non-Final Office Action dated Dec. 12, 2012 in U.S. Appl. No. 12/614,326 filed Mar. 8, 2013.
Notice of Allowance in U.S. Appl. No. 12/614,326 mailed on Mar. 19, 2013.
Non-Final Office Action in U.S. Appl. No. 13/102,627 mailed on Mar. 28, 2013.

(56) References Cited

OTHER PUBLICATIONS

Final Office Action in U.S. Appl. No. 13/459,213 mailed on Jun. 11, 2013.
Response to Non-Final Office Action dated Feb. 7, 2013 in U.S. Appl. No. 12/614,319 filed May 7, 2013.
Response to Non-Final Office Action dated Mar. 28, 2013 in U.S. Appl. No. 13/102,627 filed Jun. 17, 2013.
AF Response to Final Office Action dated Mar. 26, 2013 in U.S. Appl. No. 13/459,216 filed Jun. 26, 2013.
Request for Continued Examination in U.S. Appl. No. 12/614,326 filed Jun. 19, 2013.
Notice of Allowance in U.S. Appl. No. 12/614,326 mailed on Jul. 15, 2013.
European Patent Office Communication Pursuant to Article 94(3) EPC (Examination Report) dates Jul. 5, 2013 in EP Application No. 09759830.4.
Non-Final Office Action in U.S. Appl. No. 13/630,830 mailed Aug. 26, 2013.
Advisory Action in U.S. Appl. No. 13/459,216 mailed on Jul. 19, 2013.
Final Office Acton in U.S. Appl. No. 12/614,319 mailed on Aug. 7, 2013.

* cited by examiner

SYSTEM, METHOD, AND DEVICE FOR MEDIATING CONNECTIONS BETWEEN POLICY SOURCE SERVERS, CORPORATE REPOSITORIES, AND MOBILE DEVICES

RELATED APPLICATIONS

This application claims the benefit of U.S. Provisional Application No. 61/111,762, filed Nov. 6, 2008, and U.S. Provisional Application No. 61/252,350, filed Oct. 16, 2009, the disclosures of which are hereby incorporated by reference in their entireties.

BACKGROUND OF THE INVENTION

1. Field of the Invention

The exemplary, illustrative, technology herein relates to systems, software, and methods for implementing and managing security policies for mobile and other devices of diverse types. The technology herein has applications in the areas of mobile device and enterprise network security.

2. Description of the Related Art

Security and configuration managers manage mobile devices that are part of their network in order to maintain network security, manage use of resources, and detect or prevent misuse of such devices, but often do not have the expertise or means to understand, manage, and configure the policies on the different device types in use, using device-appropriate policy management protocols and policy servers. The plethora of such policy management protocols, policy servers, device types, and policy requirements increases the difficulty of maintaining an appropriate level of configuration control over mobile devices that may connect to a given network. Network operators can end up with a collection of separate policies, defined and managed using various policy management protocols, being served from a disparate group of policy sources, using a variety of policy servers to devices with varying capabilities for policy implementation and reporting. This can result in inadequate policy implementation and enforcement, increased costs, and inefficient use of resources as well as unacceptable risks to network security.

Policies comprise one or more policy elements that define one or more aspects of the mobile device's configuration. A policy is typically applied as a unit to a mobile device's configuration. Different device models, from the same or different manufacturers, may have differing policies that can be applied to them. Thus, the policy elements used, and their settings may vary from device to device. Policies are defined in various ways, depending on the device type they apply to, the policy server used to install them and/or verify device compliance with them. Policies are disseminated from policy servers, which act as a source of policies for transport to the devices they apply to, using various policy management protocols. Policy management protocols comprise protocols for interaction between policy servers and devices receiving policies. These protocols can provide means not only to transfer the policy to the receiving device or devices, but also to manage policies on those devices, such as by verifying that the policy has been received by the device, verifying device compliance with the policy, removing the policy, updating the policy, or other policy-related activities. The manner in which these functions are accomplished varies from one policy management protocol to another, and the functions supported also vary.

Mobile devices can have a plurality of policies applied at any given time, or sequentially over a period of time. Policies can also be stored on some mobile devices, and activated or deactivated as required. On other mobile devices, policies cannot be stored, but are activated when set, and remain activated until a newer policy is set. Most devices incorporate a method for resetting the device to "factory default" settings, which typically deactivates all policies. Multiple policies can also be active on the same mobile device simultaneously, so long as the policies do not conflict. For example, if a first policy requires e-mail to be obtained from server A, and a second policy prohibits installation of new software, there is no conflict and both policies can be active on the same device at the same time. On the other hand, if a first policy requires e-mail to be obtained from server A, and a second policy requires e-mail to be obtained from server B, there is a conflict that must be resolved.

Applying a policy to mobile devices is challenging for a variety of reasons, due to a plethora of mobile device types from various manufacturers, a plurality of management protocols developed by different mobile device vendors for setting device parameters and subsequently managing these devices, and an inconsistency between device manufacturers in the device configuration elements that are exposed on different types of mobile devices and the device configuration elements that can be managed by the possible policy management protocols supported by those devices.

Policies are provided to mobile devices using policy servers. Typically, these servers permit definition and management of policies for specific types of devices, or for a limited subset of devices that share a common policy definition. This means that a plurality of policy servers may be used to support many different types of devices. Thus, an installation might have a first policy server to manage BlackBerry™ devices, a second policy server to manage Microsoft™ Windows Mobile™ devices, and a third policy server to manage Apple iPhones™. Different policy servers may offer differing policy options and the reconciliation of these policy options and settings against an integrated security policy is tedious, time consuming, and often prone to errors. Similarly, reporting the status of device compliance using a plurality of disparate policy servers has many of the same drawbacks. Finally, different policy servers may communicate with mobile devices using their own policy management protocols, which further complicates the configuration of policies and firewalls.

Different policy management protocols may have different capabilities for setting and reporting the state of device policy elements defined within a device. This makes establishing, or determining device compliance with, security policies more difficult and error prone when a plurality of policy servers are required by use of diverse device types. For example, the Apple iPhone™ Configuration Utility requires user assistance to set configuration parameters and the user retains the ability to remove restrictions imposed by the configuration settings, while Microsoft Exchange ActiveSync™ can alter device settings without user assistance, and the BlackBerry™ Enterprise Server can set restrictions on the device user's ability to alter settings. Often, these policy management protocols manage different portions of the mobile device's configuration and are not integrated in their settings or reporting. The policy management protocol implementations can be generalized as a "policy transport". Policy transports sometimes embedded within a broader data stream, such were policy and data are passed between an applications server and a mobile device. Well known policy transports include, for example, Microsoft ActiveSync™, BlackBerry™ Policy Service (BPS), Open Mobile Alliance™ (OMA) Device Management (OMA-DM), and Apple iPhone™ Configuration Utility. The use of a plurality of policy transports can complicate the management of firewalls and other network security systems, and reduce their effectiveness in some scenarios due to the use of different lower level network protocols or ports by diverse policy transports. In some implementations, specialized software is required to be added to a mobile device in order to make the device interoperate with a specific policy transport. This is inefficient and adds to deployment cost and complexity.

Some policy servers display and manage per-device policy compliance status information. The nature of policy compliance reported varies from policy management protocol to policy management protocol, ranging from "X policy was installed" to "Device Y has a specific setting Z". To obtain a "whole enterprise" view of policies and device compliance, a user must manually reconcile the policy differences, the reporting differences, and ensure that the component systems in the enterprise are properly configured.

With a plethora of disparate policies and policy transports, what is needed are techniques and systems to integrate the policies and policy transports to provide an integrated enterprise-wide policy definition, management and compliance reporting system. Integrating these components requires more than simply collecting the information from two or more disparate policy servers and supplying it over an appropriate policy transport to the device(s) that must be made compliant. The information collected must be synchronized with respect to time, device and management protocol capabilities must be taken into account, conflicting policy requirements must be resolved, device compliance must be determined and optionally corrected, and techniques must be used to ensure that compliance status is collected and reported in a common format. In addition, this must be done in a manner that is efficient with respect to bandwidth use, device resource use, and delays perceptible to device users.

Microsoft Exchange ActiveSync™

Microsoft Exchange ActiveSync™ (EAS) is a protocol that connects mobile devices to Microsoft™ Exchange servers, allowing synchronization of e-mail and PIM (Personal Information Manager) data, such as tasks, calendars, and contacts, between Microsoft™ Exchange and the mobile device as well as limited policy management of the device by Microsoft™ Exchange.

Microsoft™ has implemented the EAS protocol on Microsoft™ Windows Mobile™ devices, and has licensed the protocol to a plurality of third-parties for use with a plurality of other mobile operating systems. Licensees include owners of mobile operating systems such as, for example, Nokia Symbian S60™, Sony Ericsson UIQ™, and Apple iPhone™, handset OEMs such as Motorola™, HTC™, and Samsung™, and third party synchronization vendors such as DataViz™. These vendors license and implement the client-side EAS Application Programming Interface (API).

The EAS protocol may include three relevant areas of processing: Handshake, Email/PIM Synchronization, and Policy Push. These are described below.

Handshake: Although EAS allows for push email from a server, EAS depends upon the mobile device to initiate the connection to the server. It is the device's responsibility to connect (and re-connect, if a connection is lost) to the server, to create the session over which email, PIM, and policy information can be pushed. The establishment of the session involves an authentication handshake, which identifies the device user (by Active Directory™ (AD) Username) and the device (by EAS Device ID and EAS Policy Key) to the Microsoft™ Exchange Server, associating the session with a mailbox for the purpose of email and PIM synchronization, and with a user and an AD group for the purpose of policy push. The EAS Policy Key is used as a first stage check to prevent continued communication if the Policy Key is not provided or is not valid. The User is authenticated either by passing the user's AD password in the protocol, or by using a client or machine certificate for client-side authentication of the SSL tunnel.

Email/PIM Synchronization: Both the device and the Microsoft™ Exchange server can "push" new (or changed) information to each other. For example, new email can be pushed from Microsoft™ Exchange to the device. New or modified contacts, calendar entries, and other PIM information can be pushed as well. Email sent from the device is pushed to the Microsoft™ Exchange Server, as well as PIM information created or changed on the device. The protocol specifies mechanisms for keeping changes synchronized between Microsoft™ Exchange and (multiple) devices.

Policy: The Microsoft™ Exchange Server can push policies to the device. These policies can be actions such as "Device Wipe" which causes the device to clear its memory and return the device configuration to its original factory state. Other policies can specify secure operation, including the requirement that the device lock itself after a period of (user) inactivity and require from the user a password or PIN of certain complexity to unlock. The device acknowledges receipt of such policies, so Microsoft™ Exchange can assume that the policy has been enforced.

BlackBerry™ Enterprise Server

BlackBerry™ Enterprise Server (BES) is a push-based server from Research In Motion™ (RIM™) that enables a secure, centrally managed link between BlackBerry™ devices and an organization's enterprise systems, applications, and wireless networks. It integrates with popular content sources such as e-mail and personal information management (PIM) systems such as IBM Lotus Domino™ and Microsoft™ Exchange, and is designed to provide secure access to e-mail, organizer data, instant messaging, Web browser, and other enterprise applications. It provides this access by retrieving information from enterprise content sources and "pushing" this content to a BlackBerry™ mobile device. In addition to applying policies to individual devices, administrators can create groups of mobile users, then apply policies for one or more groups. Approximately 450 different policies can be applied to individual devices or groups of BlackBerry™ devices, ranging from enforcing password protection and controlling access to third party mobile applications, to controlling the use of certain device features, such as using a camera or video recording.

Some policy settings take precedence over others. For example, IT policy settings override application control policy settings. If you change an Allow Internal Connections IT policy rule to "No", and if there is an application control policy set that allows a specific application to make internal connections, the application cannot make internal connections. Device users can make application permissions more, but never less, restrictive than what the BES server specifies. Devices ignore policy elements that are associated with features that the device does not support. For example, a policy element that disables use of a camera will be ignored by a device that does not include a camera. Errors are not generated in such situations.

Open Mobile Alliance™ Device Management

The Open Mobile Alliance™ (OMA) Device Management (DM) specification is designed for management of small mobile devices such as mobile phones, PDAs, and palm top computers. Device management includes, for example, provisioning, configuration, software installation or upgrade, and status reporting. A device may implement all or a subset of these features. Since the OMA-DM specification is intended for use with mobile devices, it is designed with sensitivity to memory and storage space limitations, communication bandwidth constraints, and security.

OMA-DM uses Extensible Markup Language (XML) for data exchange; specifically the sub-set defined by Synchronization Markup Language (SyncML). Device management is through a client-server relationship between a server and the client device being managed. OMA-DM is designed to support and utilize a variety of connection methods, such as Universal Serial Bus (USB) or RS-232 wired connections and wireless connections, such as Global System for Mobile communications (GSM), Code Division Multiple Access (CDMA), Infrared Data Association (IrDA) or Bluetooth. Transport can involve Website Project (WSP) or (Wireless Application Protocol (WAP)), Hypertext Transfer Protocol (HTTP), OBject EXchange (OBEX) or similar transport layers. Policy settings can be transferred in OMA Device Management Files (DDF), which are XML data files of known format.

The communication protocol used by OMA-DM is a request-response protocol. Authentication and challenge of authentication are included to ensure the server and client are communicating only after proper validation. The initial message from the server to a client is in the form of a notification, or alert message. Once the communication is established between the server and client, a sequence of messages is exchanged to complete a given device management task. OMA-DM provides for alerts, which are messages that can occur out of sequence, and can be initiated by either server or client. Such alerts are used to handle errors, abnormal terminations, etc.

The protocol specifies exchange of "packages" during a session. The packages consist of several messages, and the message in turn consists of one or more commands. The server initiates the commands and the client executes the commands and returns the results in a reply message. In some instances, the command includes policy elements to be set on the device. In others, the command reports aspects of the device's configuration status back to the server.

iPhone™ Configuration Profiles iPhone™ Configuration profiles define one or more iPhone™ settings. Configuration profiles are XML files that contain device security policies and restrictions, virtual private network (VPN) configuration information, Wi-Fi™ settings, email and calendar accounts, and authentication credentials that permit devices to work with enterprise systems. Configuration profiles can be installed on devices connected via USB using the iPhone™ Configuration Utility, or configuration profiles can be distributed by email or through a webpage. When users open the email attachment or download the profile using the Safari™ web browser on their device, they are prompted to begin the Configuration profile installation process.

Configuration profiles are created by use of the iPhone™ Configuration Utility. The iPhone™ Configuration Utility enables creation, encryption and installation of configuration profiles (for devices connected via USB), among other capabilities. A configuration profile is the whole file used to configure certain settings for a device. Apple™ also refers to a "payload" as an individual collection of a certain type of settings, such as VPN settings, within a configuration profile. Configuration profiles can be locked such that a password is required to remove one from a device after it has been installed.

Configuration profile updates are not pushed to devices. Updated profiles must be manually installed by device users. As long as the profile identifier matches, and if signed, it has been signed by the same copy of the iPhone™ Configuration Utility, the new profile replaces the profile on the device. Removing a configuration profile removes policies and all of the Exchange account's data stored on the device, as well as VPN settings, certificates, and other information, including mail messages, associated with the profile.

SUMMARY OF THE INVENTION

These and other aspects and advantages will become apparent when the description below is read in conjunction with the accompanying drawings.

The invention relates to method, system, and device for providing policy from an integrated policy server to a mobile device, the mobile device having policy compliance capabilities. The method preferably comprises receiving a data stream between a data server and the mobile device, the data stream including one or more policy transports, identifying the mobile device, identifying a policy in an integrated policy server applicable to the mobile device based on the identity of the mobile device, the policy including one or more policy elements, identifying one or more of the policy elements based on the mobile device, and supplying the identified policy elements to one or more of the policy transports for transmission to the mobile device. The device preferably comprises a policy proxy configured to carry out the steps of the above method, and the system preferably includes the data server, the integrated policy server, and the policy proxy.

The method may further include one or more of the steps of removing one or more policy elements from the data stream, translating one or more of the policy elements into a form transmittable by one or more of the policy transports, identifying a policy element to serve as a policy indicator and injecting the policy indicator into the data stream, installing the identified policy elements on the mobile device and reporting the installation of the identified policy elements on the mobile device to the integrated policy server.

The invention further relates to another method, system, and device for providing policy from an integrated policy server to a mobile device, the mobile device having policy compliance capabilities. This method preferably comprises identifying the mobile device, identifying a policy in the integrated policy server applicable to the mobile device based on the identity of the mobile device, the policy including one or more policy elements, identifying one or more of the policy elements based on the mobile device, determining whether the mobile device is in compliance with the policy based on the identified policy elements, and when the mobile device is not in compliance with the policy, assigning the identified policy elements to one or more policy transports and supplying the identified policy elements to the assigned policy transports for transmission to the mobile device. The device preferably comprises a policy proxy configured to carry out the steps of the above method, and the system preferably includes the data server, the integrated policy server, and the policy proxy.

The method may further include one or more of the steps of receiving an indicia that the policy was installed on the mobile device, reporting the installation of the identified policy elements on the mobile device to the integrated policy server, determining whether the mobile device is in compliance with the policy after receiving the indicia that the policy was installed on the mobile device, and reporting the compliance of the mobile device to the policy to the integrated policy server when the mobile device is determined to be in compliance with the policy.

The invention further relates to a method, system, and device for controlling access to a data server by a mobile device, the mobile device having policy compliance capabilities. The method preferably comprises receiving a data stream between the data server and the mobile device, identifying the mobile device, identifying a policy in an integrated policy server applicable to the mobile device based on the identity of the mobile device, and determining whether the mobile device is in compliance with the policy. The device preferably comprises a policy proxy configured to carry out the steps of the above method, and the system preferably includes the data server, the integrated policy server, and the policy proxy.

The method may further include one or more of the steps of granting the mobile device access to the data server when the mobile device is in compliance with the policy, denying the mobile device access to the data server when the mobile device is not in compliance with the policy, and, when the mobile device is not in compliance with the policy, assigning the policy elements to one or more policy transports and supplying the policy elements to the policy transports for transmission to the mobile device. Compliance with the security policy may also be determined by detecting the presence of one or more policy indicators in the mobile device, the policy indicators preferably including one or more of a digital certificate, a device configuration setting, and a policy specification. Compliance with the security policy may also be determined by determining the presence of one or more device settings and comparing one or more of the device settings to one or more of the policy elements.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

The invention described herein relates to provisioning of policies using a plurality of policy sources and policy transports, and in particular, providing these policies to a plurality of mobile device types without regard to the policy transports used to transfer the policies and install them on the mobile devices.

An aspect of the invention is a system for, and methods for management of, common policy specifications comprised of sets of common policy elements, for a collection of mobile devices. More specifically, embodiments of the invention include mechanisms and techniques for specifying and transporting policy elements using one or more policy transports, installing policy elements as device settings, reporting the state of device settings associated with the policy elements, and managing common policy specifications across a set of disparate mobile devices, possibly from different manufacturers, possibly with different operating systems, simultaneously, using one or more policy transports.

DEFINITIONS (IF APPLICABLE)

The following definitions are used throughout, unless specifically indicated otherwise:

| TERM | DEFINITION |
|---|---|
| Policy | One or more policy elements. |
| Policy Element | Defines one or more aspects of the mobile device's configuration. |
| Policy Server | A source of policies for transport to the devices they apply to, using various policy management protocols |
| Policy Transport | A policy management protocol and the policy server that implements it. |
| Policy Management Protocol | Protocols for interaction between policy servers and devices receiving policies. These can provide means to transfer policies to receiving devices, to manage policies on those devices, or enable other policy-related activities |

Exemplary System Architecture

Figure 1:
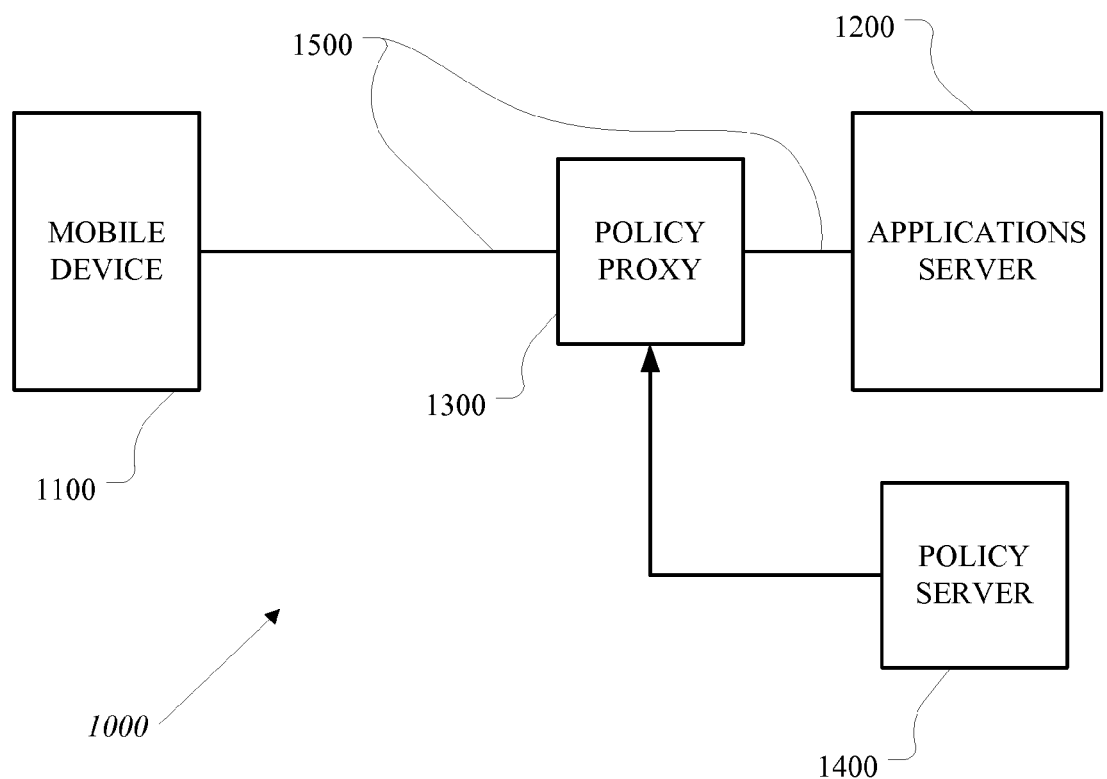
FIG. 1 illustrates an exemplary architecture of a policy proxy system according to an embodiment of the invention.

FIG. 1 illustrates a simplified architectural rendering of an exemplary implementation of a policy proxy system. The example system 1000 comprises at least one mobile device 1100 in communication with an applications server 1200 using a communication path 1500. Policy proxy 1300 is positioned in the communication path between mobile device 1100 and applications server 1200 such that it is enabled to receive, intercept, substitute, monitor or alter communications between the applications server 1200 and the mobile device 1100. Policy proxy 1300 can be supplied with one or more policies from policy server 1400, which is preferably an integrated policy server, and can cause these policies to be communicated to the mobile device 1100 for use in configuring mobile device's 1100 behavior. Policy proxy 1300 is also enabled to determine the current policy settings of mobile device 1100. In this simplified architectural rendering of an implementation of a policy proxy system, the policy proxy 1300 receives requests for communication from a mobile device 1100 or from an applications server 1200 in the form of an information and/or policy transport represented by communication path 1500. The information and/or policy transport 1500 may be any type of information and/or policy transport such as the Exchange ActiveSync™ protocol.

Figure 2:
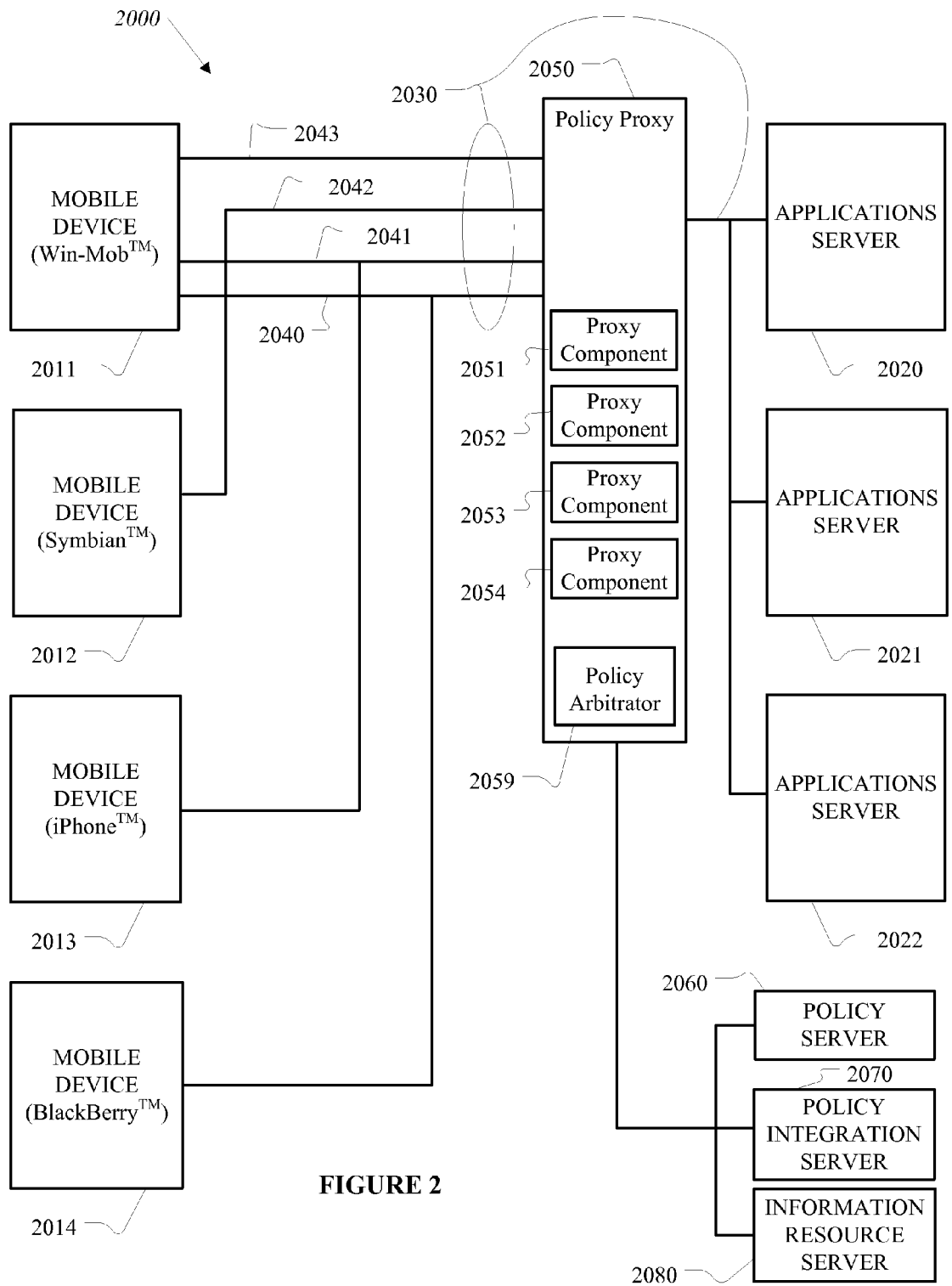
FIG. 2 illustrates another exemplary architecture of a policy proxy system according an embodiment of the invention.

FIG. 2 illustrates an architectural rendering of a more typical heterogeneous policy management system of the present invention. System 2000 comprises one or more mobile devices 2011, 2012, 2013, and 2014. Typically, these devices are developed by handset manufacturers as described above. For exemplary purposes, device 2011 is a Windows Mobile™-based device, mobile device 2012 is a Symbian-based device, device 2013 is an iPhone™, and mobile device 2014 is a BlackBerry™ device. These devices are operably linked to applications servers 2020, 2021, and 2022 over a wired and/or wireless network 2030 using one or more information and/or policy transport protocols 2040, 2041, 2042, and 2043 (collectively "policy transport protocols") intermediated by a policy proxy 2050. Applications servers information sources may include, for example, a Microsoft™ Exchange Server, a BlackBerry™ Enterprise Server, a CalDav™ server, an email server (e.g. an SMTP, IMAP, POP, or other email server), a web (i.e. HTTP/HTTPS) server, a Calendar, Task, Contacts, or other PIM data source, and/or other server useful to a mobile device. For the purpose of the example system of FIG. 2, applications server 2020 represents a Microsoft™ Exchange Server, applications server 2021 represents a BlackBerry™ Enterprise Server (BES), and applications server 2022 represents an Apple™ Configuration Utility server.

Information and/or policy transport protocols may include, for example, EAS 2043, BPS 2040, OMA 2042, and HTTP/HTTPS or e-mail used to transport Apple™ Configuration Profiles 2041.

One or more of the policy transport protocols 2040-2043 are routed through a policy proxy 2050, which comprises one or more transport protocol-specific proxy components 2051, 2052, 2053, & 2054, and a policy arbitrator 2059. A policy proxy is sometimes referred to as a "mobile services proxy". The transport protocol-specific proxy components can include, for example, an EAS proxy component 2051, a BPS proxy component 2052, an OMA proxy component 2053, an iPhone™ Configuration Profile proxy component 2054, or other proxy components configured for specific policy transport protocols as may be developed by those skilled in the art. A plurality of policy proxy 2050 instances can be used to increase throughput or to segregate transport protocol traffic. The functions of one or more transport-specific proxy components and the policy arbitrator can be integrated into a single installation, or may be divided across two or more computer systems in communication to effect the functions of the policy proxy. The policy proxy and its various components are connected using a network to one or more disparate policy servers 2060, policy integration servers 2070 and/or additional information resource servers 2080.

Disparate Policy Servers (2060)

Legacy disparate policy servers as described herein are those systems which provide policy and/or report policy configuration status for a particular type of mobile device. Disparate applications servers that include policy information include, for example, Microsoft™ Exchange, BlackBerry™ Enterprise Server (BES), and Trust Digital™ Server.

Policy Integration Server (2070)

A policy integration server as described herein provides the capability to define common policies and apply them to a plurality of device types. Optionally, a policy integration server can be configured to identify (either manually or automatically) one or more legacy disparate policy servers, such as BES or EAS servers, in the enterprise and communicate with them to determine the policies that the legacy disparate policy servers have been configured to deploy to mobile devices. The policy integration server can then integrate those policies and identify legacy disparate policy server policies that are at variance with one or more common policies defined for the policy integration server. This enables a common set of policies to be defined for a plurality of device types, and for legacy disparate server variations from these common policies to be identified for possible correction. In some exemplary illustrative embodiments, the common policies supersede legacy disparate server policies where these conflict with common policies. In a more specific embodiment, legacy disparate server policies are automatically updated to comply with common policy requirements.

Additional Information Resource Servers (2080)

Additional information resource servers 2080 may include calendar and messaging servers, such as those provided by Microsoft™ products like Sharepoint™ and Exchange, calendar servers such as those provided using an industry standard protocol such as iCal™ (e.g. Apple™ Calendar server), and the like.

Policy Proxy (2050)

A policy proxy 2050 is a component that typically operates at the enterprise network boundary and intercepts, processes, and forwards policy transport communications between mobile devices 2011-2014 and applications servers 2020-2022. Processing performed by policy proxies 2050 can comprise injection of common policy-derived policy elements or commands into policy transport exchanges between the enterprise applications servers 2020-2022 and mobile devices 2011-2014. A policy proxy 2050 can receive and/or intercept data transport communications between mobile devices 2011-2014 and applications servers 2020-2022. Such interception and processing can be done to determine whether a mobile device 2011-2014 is in compliance with required policies, to bring a mobile device 2011-2014 into compliance with required policies, to block mobile device 2011-2014 access to applications servers 2020-2022 when the mobile device 2011-2014 is not in compliance with required policies, to assure an applications server 2020-2022 that a mobile device is in compliance with required policies, to translate policy elements or commands into forms compatible with a mobile device 2011-2014 or applications server 2020-2022, or for other purposes such as logging or statistical information gathering. Methods of establishing proxy components in networks, and the general functionality needed to intercept and perform processing on data streams passing through proxies is well understood by those with skill in the art. The current invention extends the known concepts of network proxies so as to provide the policy-related functionality described herein. A policy proxy 2050 can be implemented as part of a firewall, as a stand-alone device, or as a service on a network.

The policy proxy 2050 can function as a proxy service for one or more policy transports 2040-2043, in which the policy proxy 2050 receives data packets comprising policy transport communications from both the mobile device 2011-2014 and from applications servers 2020-2022, deconstructs the policy transport protocol, adds/changes/deletes device policy elements inconsistent with the policy specifications assigned for the specific device, and inserts/changes policy elements so as to implement the common policy for the device, and finally, reassembles the policy transport communications for delivery to the mobile device 2011-2014 (and subsequent installation of the policy, if desired). Policy proxies in some exemplary embodiments can also receive, process, suppress, or deliver data packets comprising protocols other than policy transport communications, such as when acting as a firewall, or to prevent communication between non-compliant mobile devices and enterprise servers.

In some exemplary embodiments, a policy proxy 2050 can function as a policy compliance checking system, wherein the policy proxy 2050 uses one or more policy transports 2040-2043 to determine whether a mobile device 2011-2014 is in compliance with required policies. When a mobile device 2011-2014 is determined to be in compliance with required policies, the policy proxy 2050 permits communication between the mobile device 2011-2014 and applications servers 2020-2022. When a mobile device 2011-2014 is determined to be out of compliance with required policies, the policy proxy 2050 can, in some exemplary embodiments, cause the mobile device 2011-2014 to be brought into compliance.

In some exemplary embodiments, the policy proxy 2050 acts as a firewall to prevent mobile device 2011-2014 communications from reaching applications servers 2020-2022 until the mobile device 2011-2014 has implemented the common policy assigned to it and demonstrated compliance with the common policy through interactions with the policy proxy 2050. In such exemplary embodiments, the policy proxy 2050 is configured to act as a policy transport, at least to the extent required to implement this functionality, for the device types supported.

In some exemplary embodiments the policy proxy 2050 comprises one or more transport protocol-specific proxy components 2051-2054 useful to implement device-specific aspects of the functionality of the policy proxy 2050.

In some exemplary embodiments, a policy proxy 2050 can provide one or more of the following services:

Policy compliance checker for the mobile device. The policy proxy 2050 can function as a policy compliance checker, where the current state of a mobile device's 2011-2014 policy compliance is determined through interaction between the policy proxy 2050 and the mobile device 2011-2014 using one or more policy transports 2040-2043. The results of such checks can form the basis for blocking access to applications servers 2020-2022, for injecting policy elements into the mobile device 2011-2014 to bring it closer to compliance with required policy, or for other purposes.

Policy injector to the mobile device. The policy proxy 2050 can function as a policy injector, where third party policy elements, such as policy elements derived from a common policy, can be injected into a policy transport communication stream 2040-2043 between an applications server 2020-2022 and a mobile device 2011-2014. These injected policy elements may augment and/or replace portions of the policy transport communication stream. In some exemplary embodiments policy elements can also be removed from policy transport communication streams. Policy injection can be done at the request of the mobile device 2011-2014, as a result of a mobile device 2011-2014 being found to be out of compliance with required policies during a compliance check, or for other reasons, such as administrator command, periodic scheduling of such injection, or for other reasons.

Policy results interceptor. The policy proxy 2050 can also function as a policy results interceptor, in which policy and configuration results are intercepted in transit from a mobile device to an applications server, and the stream of policy and/or configuration results are redirected to additional and/or alternative applications servers and/or policy servers.

Policy results injector to the applications server. The policy proxy 2050 can also function as a policy results injector to an applications server 2020-2022 by formulating responses to applications server 2020-2022 policy status queries or other policy transport communications and using them to respond to the applications server 2020-2022. This capability can be used to satisfy an applications server 2020-2022 that a mobile device 2011-2014 is in compliance with its required policies, whether the mobile device 2011-2014 is actually in compliance or not, or to cause the applications server 2020-2022 to specify the policy it expects the mobile device 2011-2014 to be in compliance with. The former capability is useful when an applications server 2020-2022 is requiring compliance with a policy that is less strict than a common policy applicable to the mobile device 2011-2014, when an applications server 2020-2022 is requiring a policy that is more restrictive than a common policy applicable to a mobile device 2011-2014, when an applications server 2020-2022 is not configured to interoperate with the particular mobile device 2011-2014, or for other purposes as will be apparent to those with skill in the art. The later capability is useful for enabling the policy proxy 2050 to collect legacy policy server policy elements for integration into common policies or for other purposes.

Application firewall. The policy proxy 2050 can function as an application-aware firewall for one or more network transport protocols 2040-2043. The policy proxy 2050 is therefore enabled to intercept all elements of the mobile device 2011-2014 to applications server 2020-2022 communication stream and mediate the operation of the network transport protocol. For example, a policy proxy 2050 may deny communication by policy (e.g., from restricted devices, by network source, or by time-of-day). Alternatively, a policy proxy 2050 may deny particular interactions by policy (e.g., restrict "contacts" synchronization but permit e-mail synchronization). In addition, a policy proxy 2050 may ensure that commands and data in the session are properly formed, to prevent the backend applications servers 2020-2022 from acting on requests that may cause unpredictable behavior.

Application information routing and mediation. Policy proxy 2050 may function to provide rule-based synchronization of other information sources 2080 and to provide synchronization between these sources and a mobile device 2011-2014 under the instruction of one or more policy-based rules. A policy proxy 2050 can synchronize the mobile device 2011-2014 with third party e-mail or PIM information. For example, "contacts" from a Customer Relations Management (CRM) system could be shared with specific mobile devices. Alternatively, alerts may be injected as e-mails.

The policy proxy enables mobile devices to synchronize business information (e.g. E-mail and PIM information) with a variety of additional information resource servers (e.g., Lotus Notes™, Microsoft Hotmail™, and Google Gmail™), without specialized software on the mobile device. In one aspect, the synchronization occurs transparently without the mobile device being aware of the source and/or destination of the information being synchronized. In a second instance, the policy proxy can combine information from a plurality of information resource servers into a single content stream for synchronization with the mobile device, and split the information stream from the device to its respective information resource servers. This is useful when the server provides the system of record with a specific type of information, for example, business contacts in the CRM system, internal company contacts in the company directory, and the like. Similar types of information handling are available for each type of PIM data, such as tasks, calendar entries, contact records, email, documents, and the like.

Policy proxies make use of rules for various aspects of their functioning, such as the rule-based synchronization described above, and the delivery rules described below. The term "rules", as used herein, refers to any method of describing the relationship between specific data inputs and an action or other behavior on the part of a policy proxy. For example, a rule can specify that a mobile device that possesses digital certificate A is to be permitted to access a given enterprise network, and that a mobile device that does not possess digital certificate A is not permitted to access a given enterprise network. Rules can encode a wide range of information in ways that are useful to implement such things as common policy specification translation into policy transport compatible forms, policy transport to device type compatibility, and common policy specifications. In some exemplary embodiments rules are specified in the form of XML documents, with one or more rules being described by the XML document(s). For example, a document that describes a common policy specification comprising three rules can be structured as follows:

```
<common_policy>
    <min_password_len> 8 </min_password_len>
    <auto_dev_lock> yes </auto_dev_lock>
    <dev_lock_delay> 600 seconds</dev_lock_delay>
</common_policy>
```

Other exemplary embodiments specify rules using other mechanisms, such as table lookups, associative arrays, hashes, comma-delimited lists, name-value pairs, tagged data, pre-defined value sequences, or any other method as will be understood by those having skill in the art.

Returning to FIG. 2, the policy proxy 2050 operates as follows when a policy has been identified for sending to a mobile device 2011-2014. The policy proxy 2050 receives the policy to be sent and an identification of the mobile device the policy is applicable to. The Policy Arbitrator 2059 component decomposes the policy into its constituent policy elements, maps these policy elements against the policy compliance capabilities of the device, identifies applicable and available policy transports, transforms policy elements to one or more device-specific policy elements appropriate to the mobile device to ensure that all policy elements in the policy are compatible with the mobile device's policy compliance capabilities, maps the resulting policy elements against the policy elements that the applicable and available policy transports can transport to and install on the mobile device, groups policy elements by the identified policy transports, and causes the policy to be transported to the specified mobile device(s) and installed on the device(s). In some exemplary embodiments, the grouping of policy elements by the identified policy transports is done in a manner that minimizes the number of policy transports that are needed to transport the policy to the mobile device(s).

In typical usage, a mobile device 2011-2014 initiates a connection to an applications server 2020-2022 or other server 2080 using a network transport protocol built into the mobile device 2011-2014. The network transport protocol is routed through the policy proxy 2050, which identifies the mobile device and the protocol being used. If the policy proxy 2050 and/or network transport protocol-specific proxy components 2051-2054 are acting to enforce policies related to access times, the current time is compared against the policy access time restrictions. If the policy access time restrictions prohibit access at the current time, the mobile device 2011-2014 is prevented from communicating with at least one of the applications servers or other server. If the policy access time restrictions do not prohibit access at the current time, the access is not blocked based on policy access time restriction. The policy proxy may still block communication for other reasons, such as non-compliance with a required policy other than access time. For example, the policy proxy may block access to one or more applications servers if it is determined that the mobile device is not in conformance with specific policies regarding its configuration.

The policy proxy operates, in conjunction with policy transport-specific proxy components 2051-2054 and a policy arbitrator 2059 to identify a policy integration server 2070 to use for common policy specification. The policy proxy communicates with this policy integration server 2070, obtains the common policies to be enforced for a mobile device 2011-2014, and then applies the policies to the mobile device.

Figure 3A:
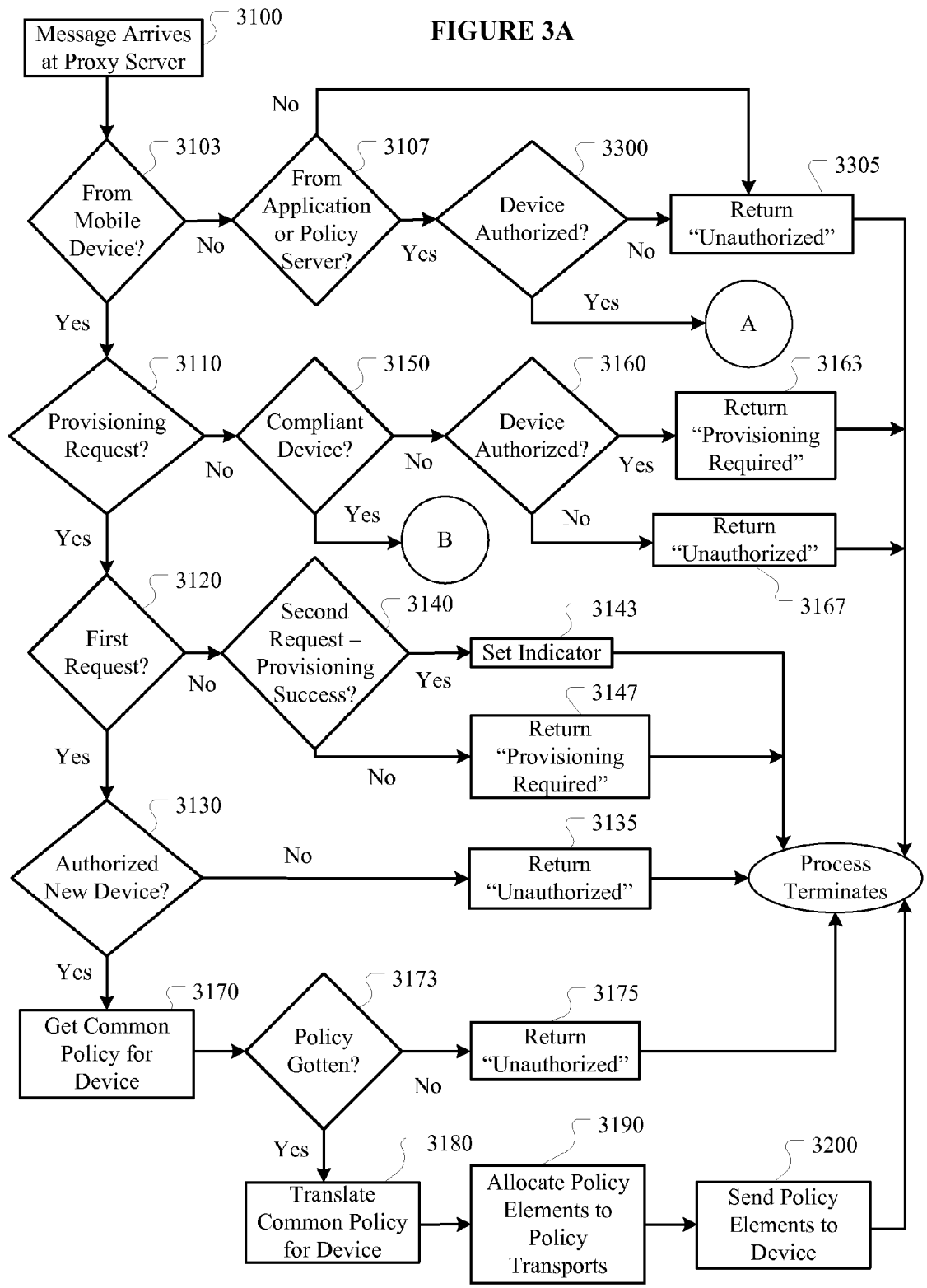
FIGS. 3A-3C are flowcharts depicting message handling by an exemplary policy proxy system according to an embodiment of the invention.
Figure 3B:
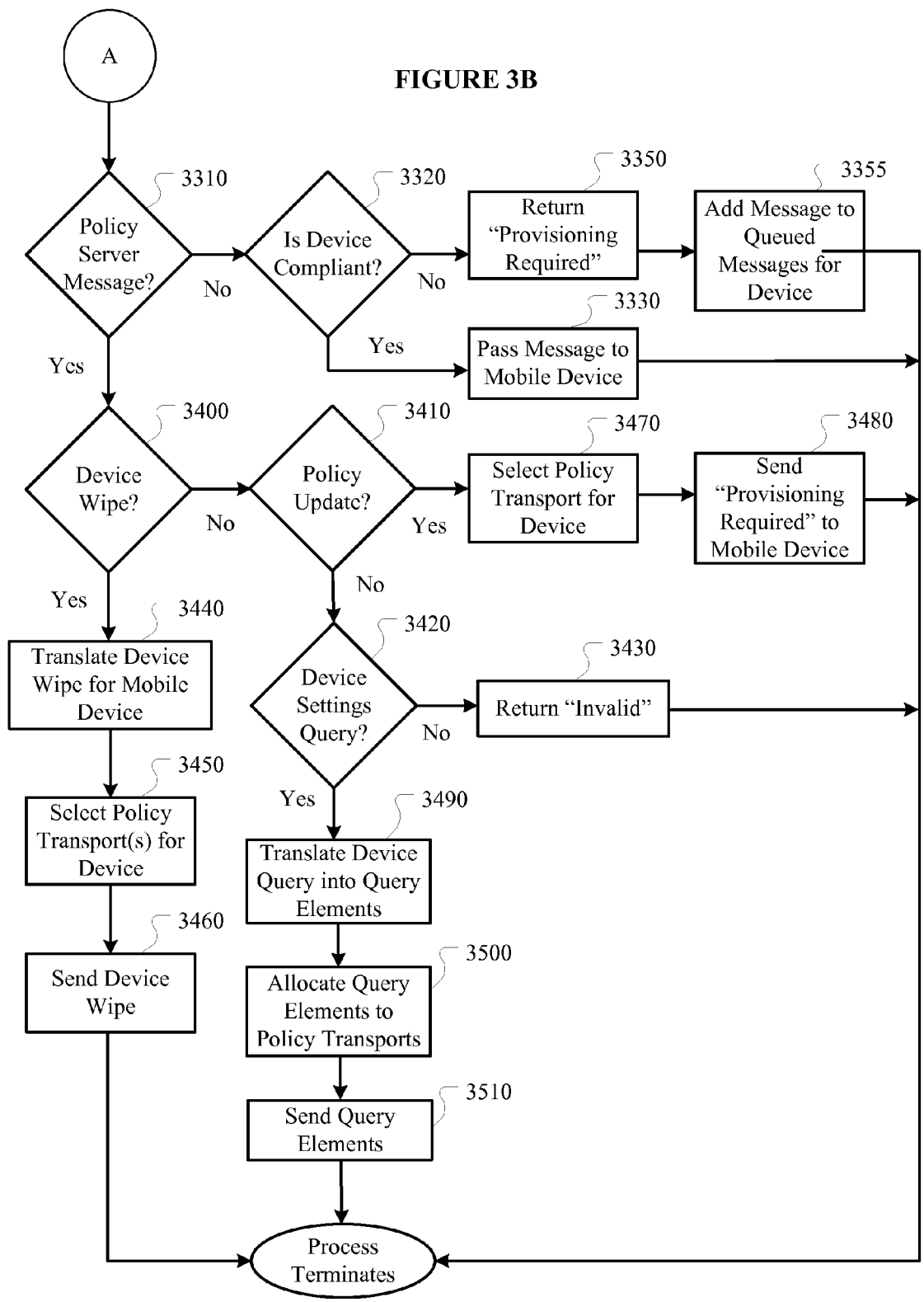
Figure 3C:
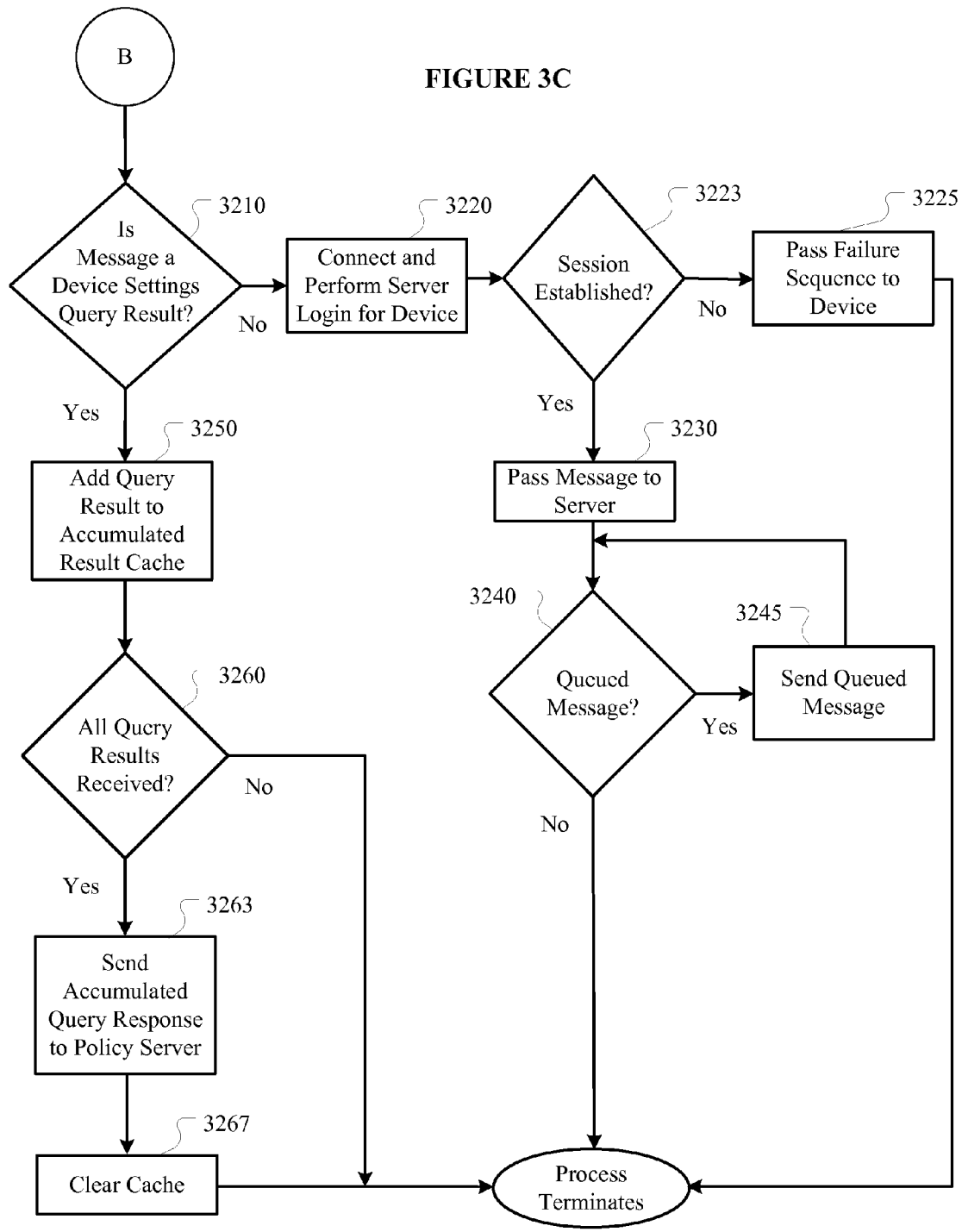

FIGS. 3A, 3B, and 3C show internal processing flows of an exemplary policy proxy when a message is received by the policy proxy 3100. If the message is from a mobile device 3103, a check is made to see if the message is a provisioning request 3110. A provisioning request occurs when a device is attempting to acquire policy settings so as to become compliant with required policy. If the message is a provisioning request, a check is made to see if this is the first step in the provisioning process by this device 3120. If it is, the policy proxy checks to see if the device is a known device that is authorized 3130. If the device is not a known and authorized device 3135, an "Unauthorized" response is returned to the device, and the process is complete. If the device is known and authorized, the policy proxy attempts to get a common policy specification for the device 3170. Common policy specifications can be specific to a particular device, to all devices in a particular group, to a particular device type or device OS (e.g. Windows Mobile™ OS, BlackBerry Storm™, or Symbian™ OS), or to any combination of these. If the policy proxy can not obtain a common policy specification for the particular device 3173, an "Unauthorized" response is returned to the device, and the process is complete 3175. If the policy proxy is successful in obtaining a common policy specification 3173, the policy arbitrator 6050 (see FIG. 6) of the policy proxy translates the common policy specification into one or more sets of policy elements 3180, each assigned to an appropriate policy transport 3190, the policy elements are sent to the mobile device 3200, and the process is complete.

If the message is a provisioning request 3110, but not the first message in the process 3120, a check is made to see if it is a provisioning success response 3140. If it is, an indicator is set in the device 3143 to show that it is now compliant. The indicator can be a digital certificate, a special setting, or other indicator as described elsewhere herein. Once the indicator is set, the process is complete. If the message is not a provisioning success response 3140, a "Provisioning Required" message is returned 3147, and the process is complete.

If the message is not a provisioning request 3110, a check is made to see if the device is compliant with required policy 3150. Such a check can, in various embodiments, comprise for example requesting an indicator from the device, checking a local cached copy of an indicator (optionally with an expiration time on the cached copy), checking a flag set for a communication session by a previous indicator check, or testing a device by making a request prohibited by required policy and determining whether the request was carried out or not. If the mobile device is not compliant 3150, a check is made to see if the device is a known device that is authorized 3160. If the device is known and authorized, a "Provisioning Required" message is returned 3163 and the process is complete. If the device is not known and authorized, an "Unauthorized" message is returned 3167 and the process is complete.

If the mobile device is compliant 3150, a check is made to see if the message is a device settings query result 3210. If not, the policy proxy connects to the requesting server and performs the server login as if it were the mobile device making the connection 3220. In doing so the policy proxy can use data sent by the mobile device, as is typical of proxy servers in general, and understood by those with skill in the art. If a connection with the server can not be established 3223, the failure sequence supplied by the server as a result is passed to the mobile device 3225 and the process is complete. If a connection with the server is established 3223, the device settings query result message is passed to the server 3230. A check is then made to see if there are any other messages queued to be sent to either the mobile device or the server 3240. If there are, one is sent and removed from the queue 3245, after which another check is made for queued messages 3240. This process is repeated until there are no more queued messages 3240, at which point the process is complete.

If the message is a device settings query result 3210, the message contents are added to an accumulated results cache for this particular query 3250. This is done because device settings queries can be requested by servers that do not make use of policy transports compatible with all devices, or may not make use of preferred policy transports. The policy proxy translates the device settings query from the server into a form compatible with the mobile device, and the preferred policy transports used with it, before sending the query to the mobile device. In some cases this can require use of a plurality of policy transports, due to the fact that not all policy transports provide access to all device settings, or for other reasons such as policy transport availability at the time of the request. Responses to these queries by the mobile device can arrive in a plurality of response messages, and these are re-assembled and translated into a form compatible with the requesting server before the results are sent to the requesting server. Once the device settings query results from the message have been added to the accumulated results cache, a check is made to see whether all results have been received for the query 3260. If not, the process is complete. If so, the accumulated results are translated into a form compatible with the requesting server and sent to the server using the connect and send method described above 3263. Once the results have been sent to the requesting server, the accumulated results cache for the query is cleared 3267, and the process is complete.

If the message was not sent from a mobile device 3103, a check is made to see if it was sent by an application or policy server 3107. If not, an "Unauthorized" response is returned 3305, and the process is complete. Checks for application or policy server origin can be performed by any method, such as lookup of network addresses, use of key exchanges, passwords or other authentication, identification of protocol in use, lookup tables, or other means. If the message is from an application or policy server 3107, a check is made to see if the device the message is destined for is a known and authorized device 3300. If not, an "Unauthorized" response is returned 3305 and the process is complete. If so, a check is made to see if the message is from a policy server 3310. If the message is not from a policy server, then a check is made to see if the destination device is in compliance with required policy 3320 as described above. If the mobile device is not compliant 3320, a "Provisioning Required" message is sent to the device 3350 and the message is added to the queued messages queue for the device 3355 and the process is complete. Once the device has been made compliant, the queued messages will be sent to it as described above at 3240 and 3245. If the mobile device is compliant 3320, the message is sent to the mobile device 3330 and the process is complete.

If the message is from a policy server 3310, a check is made to see if the message is requesting a device wipe 3400. If the message is requesting a device wipe 3400, the policy proxy's policy arbitrator 6050 translates the request into the form compatible with the particular mobile device 3440 and selects an appropriate policy transport to send the request with 3450, then sends the request to the mobile device 3460, after which the process is complete.

If the message is not requesting a device wipe 3400, a check is made to see if the message is a policy update message 3410. If the message is a policy update message 3410, an appropriate policy transport is selected 3470, and a "Provisioning Required" message is sent to the mobile device 3480 after which the process is complete. In some exemplary embodiments, cached indicators, session status flags or other records of the mobile device being in compliance are cleared at this point If the message is not a policy update message 3410, a check is made to see if it is a device settings query 3420. If not, an "Invalid Request" result is returned to the sending server 3430, and the process is complete. If it is a device settings query 3420, the query is translated into a set of query elements 3490 by the policy proxy's policy arbitrator 6050 component, assigned to appropriate policy transports 3500, and sent to the mobile device 3510, at which point the process is complete. The processing of the mobile device's response(s) is described above.

Policy Arbitrator (2059)

Continuing with FIG. 2, the policy arbitrator 2059 component mediates policy requirements between a mobile device 2011-2014 and one or more policy servers 2060, and additionally serves to receive policies created by an policy integration server 2070, determine the appropriate policy transport(s) 2040-2043 to use, optionally apply translations of policy elements to policy transport and device-specific settings, and route the policy elements to the appropriate policy proxy component 2051-2054. In some instances, the policy arbitrator 2059 determines that one or more policy elements being sent to a mobile device require the use of more than one policy transport. This can happen when a first policy element to be sent to a mobile device is not supported by each of the available policy transports and a second policy element to be sent to a mobile device is not supported by any available policy transport that also supports the first policy element. Thus, a single policy might be split so that a first set of policy elements are sent to a mobile device using a first policy transport, and a second set of policy elements are sent to the mobile device using a second policy transport.

Similarly, the policy arbitrator mediates the returned configuration values from the policy transports and returns them to the appropriate policy server(s). Thus, a policy transport might report policy elements A, B, and C. The policy arbitrator, on the basis of where the configuration results are to be processed and/or stored, might route policy elements A and B to a first policy server, and policy element C to a second policy server.

Alternatively, the policy arbitrator may decide to route policy elements to a plurality of policy servers. In embodiments of this type, policy elements A and B might be routed to a first policy server, and policy elements A and C might be routed to a second policy server.

It is sometimes not possible to manage all of the desired policy elements using a single policy transport. In this case, the policy arbitrator 2059 selects groups of policy elements and allocates them to different policy transports. This introduces an asynchronous aspect to policy elements, where a first set of policy elements is delivered to the mobile device by a first policy transport before or after a second set of policy elements is delivered to the mobile device by a second policy transport. In some cases, policy transports are unable to recognize policy elements handled by the other policy transports. In other cases, some policy elements can be recognized by both policy transports. In still other cases, other aspects of the mobile device can be identified and reported by one or more transports. In this last case, the policy proxy 2050 can cause additional configuration-specific device settings or policy elements to be applied to the mobile device. These additional configuration-specific device settings are called "indicator" settings. The policy proxy causes a first policy transport to report upon these "indicator" settings as applied by a second policy transport, and treats the presence or absence of a particular indicator setting as an indication of whether the mobile device's settings associated with the second policy transport have been applied to the mobile device. In some embodiments, the indicator settings can be digital certificates.

Lastly, the policy arbitrator 2059 may provide mapping and translation services between policy elements in policies supplied by policy servers, and the policy elements used with a particular mobile device and selected available policy transports. The mapping process between policy elements of a policy and policy elements compatible with a mobile device can involve a one-to-one mapping of the policy element to a device configuration setting, a translation of the policy element to a device specific setting (e.g. mapping the policy element value of "Yes" to a binary value of 1 in the device setting), provide a many-to-many mapping, where one or more policy elements are mapped to one or more device settings (with optional translation of values as appropriate), and/or the creation of additional and/or new device configuration settings as necessary. For example, a new indicator setting may be created in the form of a digital certificate. In other implementations, policy elements may not be mapped to a device configuration setting.

Compliance Binding

In some exemplary embodiments where indicator settings comprise digital certificates, the digital certificates used to indicate compliance with the associated policy or policies can also be used for authorization to connect to an enterprise network. Network components such as VPN concentrators, firewalls, Secure Socket Layer (SSL) termination points, load balancers, or routers can require possession of a valid digital certificate before permitting a mobile device to access the network. When the compliance status of the mobile device changes, such as when a common policy is revised, the group membership of the device or device user changes, or for any other reason, the digital certificate is revoked. Such revocation of the digital certificate indicates the non-compliance of the mobile device with required policy and also prevents the device from accessing the enterprise network, possibly including any policy proxies. When the device is brought into compliance with required policy, a new digital certificate indicator setting is used to indicate compliance, and also permits access to appropriate aspects of the enterprise network.

iPhone™ Policy Proxy Component

The iPhone™ Policy Proxy Component intercepts the http session over which a file comprising policy elements is delivered to the mobile device, as well as any required Simple Certificate Enrollment Protocol (SCEP) session by which device certificates are delivered to the device. The iPhone™ Policy Proxy Component is configured to translate policy elements from one or more policy servers into iPhone™ Configuration Profile format, and then generate and optionally sign/encrypt the Configuration Profile files in the appropriate format.

EAS Proxy Component

One embodiment of the proxy interceptor described above is an EAS proxy. EAS Proxy technology intercepts and manipulates the EAS protocol between a Microsoft™ Exchange Server and a mobile device. Architecturally, the EAS Proxy is similar to an application firewall for Microsoft™ Exchange. It can be deployed as a network appliance, as part of a firewall, as part of a policy proxy, as a service on an IAS server, or using other techniques well understood by those skilled in the art.

The EAS Proxy component monitors the EAS protocol between a Microsoft™ Exchange Server and one or more mobile devices. In addition to monitoring, filtering, and mediating the EAS protocol, the EAS proxy can inject commands into the stream, both towards the device and towards Microsoft™ Exchange, as well as extracting or replacing elements in the stream (e.g., commands or authentication information).

The EAS Proxy component, in combination with the policy proxy, allows a management system other than Microsoft™ Exchange to observe, filter, and change the EAS protocol stream, as well as injecting new commands into the stream and capturing the results. This provides the enterprise with a richer device management system than Microsoft™ Exchange natively provides. In some embodiments, this may be performed without adding another connection or protocol between the enterprise datacenter and the device. This reduces firewall policy changes at the enterprise, as well as overhead on the device.

The EAS proxy allows other servers, in addition to the Microsoft™ Exchange Server, to participate in the EAS Handshake, Email/PIM Synchronization, and Policy processing. Some use cases for the EAS Proxy include, for example:

Splitting Off the EAS Policy Stream: by Leaving Handshake and Email/PIM

Integrates synchronization with the Microsoft™ Exchange Server over EAS, but by splitting off policy information and redirecting it to an external policy integration server, an external Policy integration server can manage policies on the mobile device instead of the Microsoft™ Exchange server. This allows the Microsoft™ Exchange Server to manage and synchronize each user's mailbox with his mobile device, but allows a separate policy integration server to manage policies for each device.

Credential Translation

By intercepting and modifying the handshake process, the EAS Proxy can translate device specific credential to mailbox specific credentials, removing the device's knowledge of globally useful mailbox specific credentials. For example, credential translation allows a device to access a mailbox without storing the user's AD password on the device. This works in the following way:

The EAS client on the mobile device is provisioned with (possibly device specific) credentials that the policy integration server associates with a user.

The EAS Proxy intercepts handshaking information from within EAS headers.

The EAS Proxy queries the policy integration server, to authenticate the device associated with the captured handshaking information. The policy integration server returns the associated user information.

The EAS Proxy replaces the intercepted handshaking credentials with credentials appropriate for that user. That could be the user's actual AD username or password, or more optimally, a Kerberos ticket for that user.

A Client EAS Application Firewall

Since the client EAS will only communicate with the trusted and designated EAS URL, the EAS Proxy can function as a remote and hosted EAS Client-Side Application Firewall.

Handshake Processing

By processing EAS's handshake protocol, the EAS Proxy can enable the third-party policy manager to function without Microsoft™ Exchange.

Figure 4:
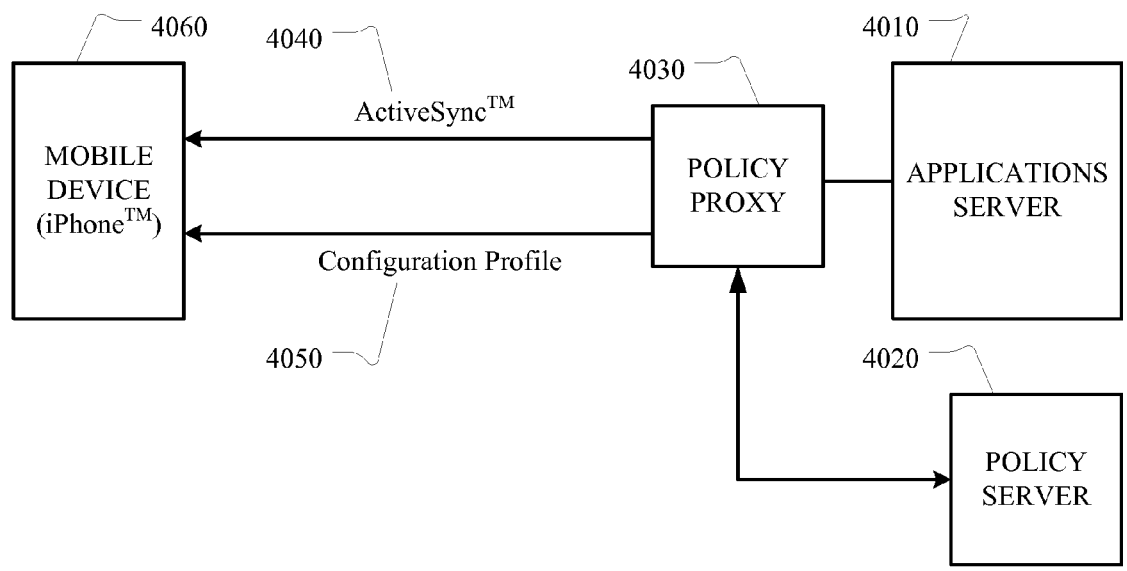
FIG. 4 illustrates an iPhone™ specific exemplary architecture, illustrating plural communication transport channels and policy splitting across transports, according to an embodiment of the invention.

In FIG. 4, a specific example of a policy proxy operating to check compliance and synchronize policies to an iPhone™ is displayed. The policy proxy checks and enforces compliance of all iPhone™s before permitting them to enter the corporate network to access applications servers in order to ensure that ActiveSync™ policies and configuration profiles remain persistent. This is enabled using indicator settings that logically bind ActiveSync™ policies and iPhone™ configuration profiles for compliance purposes.

The iPhone™ mobile device (4060) requests registration by providing authentication information regarding the user to the enterprise. The iPhone™ (4060) then makes an SCEP request to the enterprise, which is intercepted by the policy proxy (4030). The policy proxy passes this request for fulfillment to one of the policy servers (4020). In some embodiments, the policy server (4020) could be an policy integration server. The SCEP request is fulfilled by sending a device certificate that uniquely identifies the iPhone™ (4060) to the network.

The iPhone™ (4060) then makes a configuration request to the enterprise using the device certificate to authenticate the device endpoint of a secured http session. The policy proxy (4030) intercepts this request, queries the policy integration server (4020) using the device identified by the device certificate, and receives a policy from the policy integration server in response to the request. The policy arbitrator component (not shown) translates the policy received from the policy integration server into a form that can be processed using Apple™'s Configuration Profiles. The policy arbitrator also generates at least one indicator policy element in the Configuration Profile. This indicator policy element is a second device certificate. Some of the policy elements are not processable using Apple™ Configuration Profiles, so these policy elements are configured for sending to the iPhone™ using a Microsoft™ Exchange ActiveSync™ policy transport. Because the integrated policy was split (by the policy arbitrator) into a plurality of independently delivered policy sets, it is necessary that an indicator policy element be used to indicate when each part of the policy has been installed on the iPhone™. The policy arbitrator creates an indicator policy element for one or more policy sets delivered using policy transports that do not report their installed status (e.g. configuration profiles policy transport) on an iPhone™ and causes these indicator policy elements to be transmitted to the iPhone™ as part of the appropriate configuration profile (4050). The remaining policy elements to be transmitted to the iPhone™ using the ActiveSync™ policy transport protocol (4040).

When the policy settings are transmitted to an iPhone™ (4060) using ActiveSync™ (4040), an ActiveSync™ key is returned by the protocol to indicate that the ActiveSync™ portion of the policy was installed on the device. The configuration policy is transported to, and installed by, the iPhone™ (4060), which causes the indicator policy setting (typically, in the form of a device certificate) to be installed on the iPhone™. When the policy proxy (4030) next interrogates the iPhone™ (4060), the device certificate provided as an indictor policy setting is provided by the iPhone™. This indicates to the policy proxy (4030) that both halves of the policy have been installed on the device. The policy proxy (4030) then updates the device status in the policy integration server (4020). This updated status represents the integrated compliance status of the device.

The configuration policy mechanism of the iPhone™ (4060) operates because the iPhone™ accepts configuration policy elements on an "all or none" basis, and locks these settings into the iPhone™. A user can change these settings by resetting the policy on the device, which will clear both the policy settings and the indicator policy setting. Once cleared, the indicator policy setting (a device certificate) is no longer reported to the policy proxy when the iPhone™ (4060) connects, indicating that the iPhone™'s policy settings are no longer set in accordance with the policy.

In some embodiments, a new copy of the policy is pushed to the iPhone™ (4060) to replace the missing policy elements. In other embodiments, the policy integration server (4020) generates an alert that the iPhone™ is no longer in compliance with policy. In still other embodiments, the iPhone™ (4060) is denied access to the applications server (4010) (e.g. denied e-mail, calendar, or other services) when it is not in compliance with policy.

In one embodiment, the indicator setting is a device certificate that is cryptographically tied to the settings provided using the configuration profiles (4050). Other methods of creating an indicator policy setting are possible.

In alternate embodiments, a plurality of indicator policy settings may be used to indicate that one or more portions of a policy have been installed. For example, an iPhone™ configuration profile (4050) has several sections, one for the wireless phone network, one for WiFi settings, etc. A separate indicator policy setting may be created for the configuration policy section(s).

Figure 5:
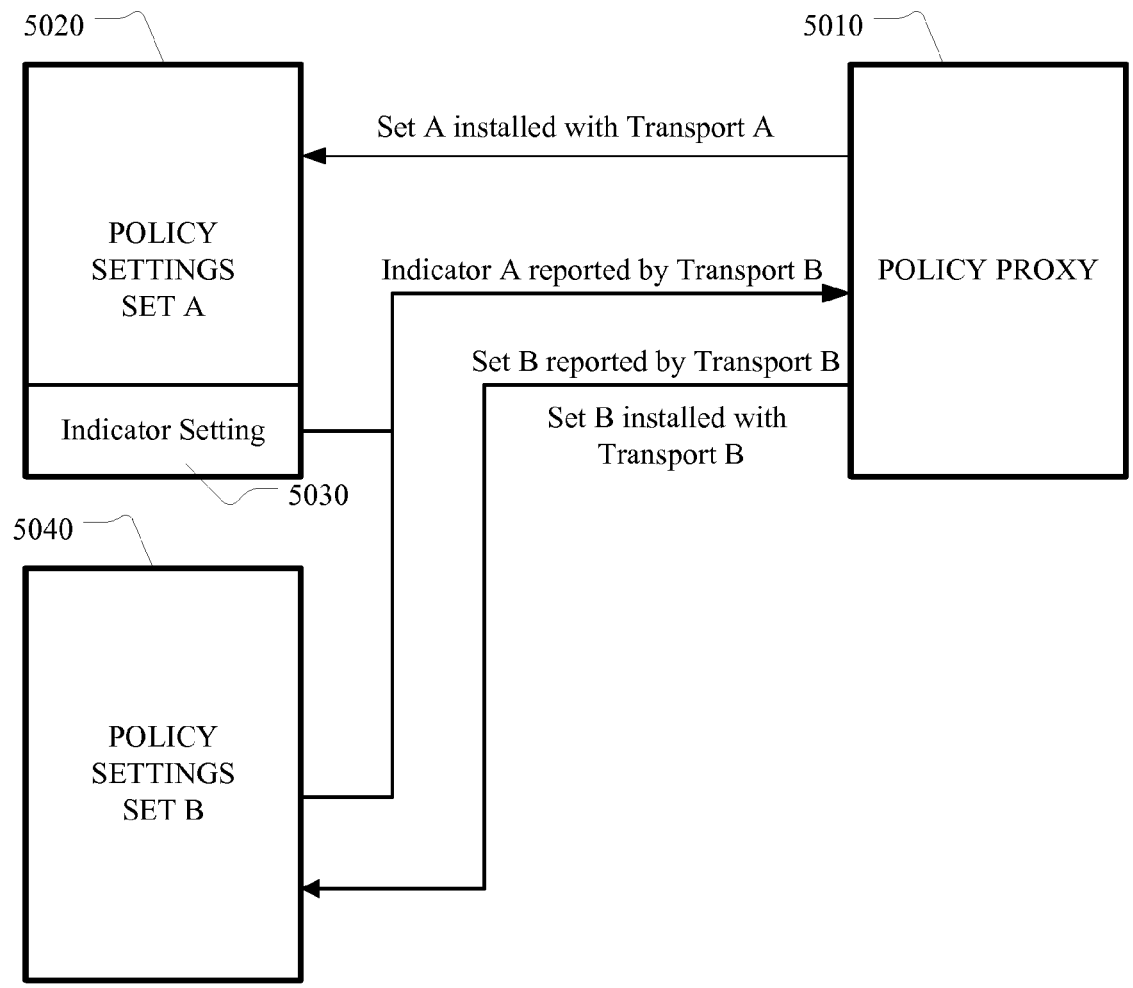
FIG. 5 illustrates the use of indicator settings by a policy proxy with a mobile device according to an embodiment of the invention.

FIG. 5 illustrates an exemplary use of indicator settings when a policy proxy is using two or more policy transports to set policies on a mobile device. The policy proxy identifies a policy proxy 5010 and mobile device, and determines that two policy transports are the most effective way to deliver policy to the device. In this example, the policy transports are referred to as policy transports A and B. The description for FIG. 4 describes this scenario using Apple™ Configuration Profiles and Microsoft™ ActiveSync™ as the two policy transports. The policy proxy splits the policy to be delivered to the device into two subsets, policy settings A (5020) and policy settings B (5040). It adds an indicator policy element (5030) to policy settings A, and then causes policy transport A to deliver policy settings A to the mobile device, and policy transport B to deliver policy settings B to the mobile device. Policy transport A may not report on the settings of the device, so it is necessary for policy transport B to report on an indicator set by policy settings A that is visible to policy transport B. Policy transport B reports on the presence or absence of the indicator setting. This report is used by the policy proxy to determine whether or not policy settings A are installed on the mobile device. A useful indicator setting is one in the form of a device certificate, as device certificates are visible (and are often presented as credentials to the policy proxy) to most policy transports. Other indicator settings may be used as long as they can be set by a first policy transport and reported upon by a second policy transport.

In some implementations, policy settings established by remote servers may not be changed in part by the end user. An end user may delete the policy settings as a group (e.g. deleting policy settings A by deleting group A or by resetting the device and clearing all settings). This technique is especially effective in these implementations.

Figure 6:
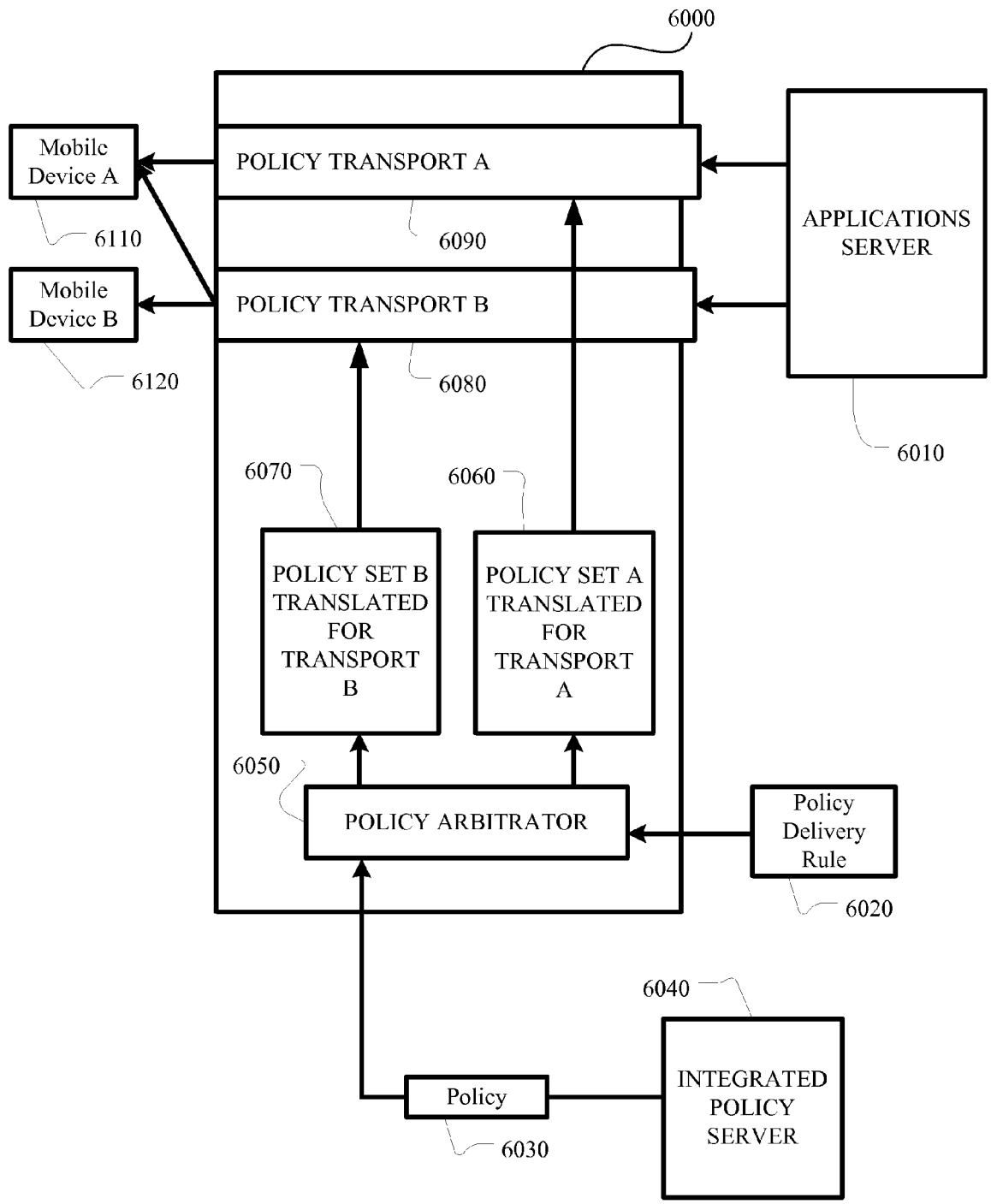
FIG. 6 illustrates an internal flow diagram of a policy proxy according to an embodiment of the invention.

FIG. 6 illustrates a simplified example of the operation of the policy proxy. In this example, policy proxy 6000 intermediates the connection using policy transport A and policy transport B between mobile device A (6110), mobile device B (6120) and an applications server (6010). The policy proxy comprises two policy transport components for policy transports A and B, for example, such as an EAS policy component and an iPhone™ Proxy component as described above. The policy proxy further comprises a policy arbitrator as described above.

The policy proxy is configured with one or more policy delivery rules 6020, which specify which configuration settings may be set and managed by each particular policy transport for each particular device type. These rules are used by the policy arbitrator 6050 to process policy 6030 from the integrated policy server 6040, and to split the policy into disparate policy sets A and B (6060 and 6070 respectively). These policy sets are delivered to the policy proxy components 6080 and 6090 respectively for further delivery to one or more mobile devices. Similar rules define how information is collected from or delivered to an applications server 6010.

Sending Policy on Device Query

Figure 7:
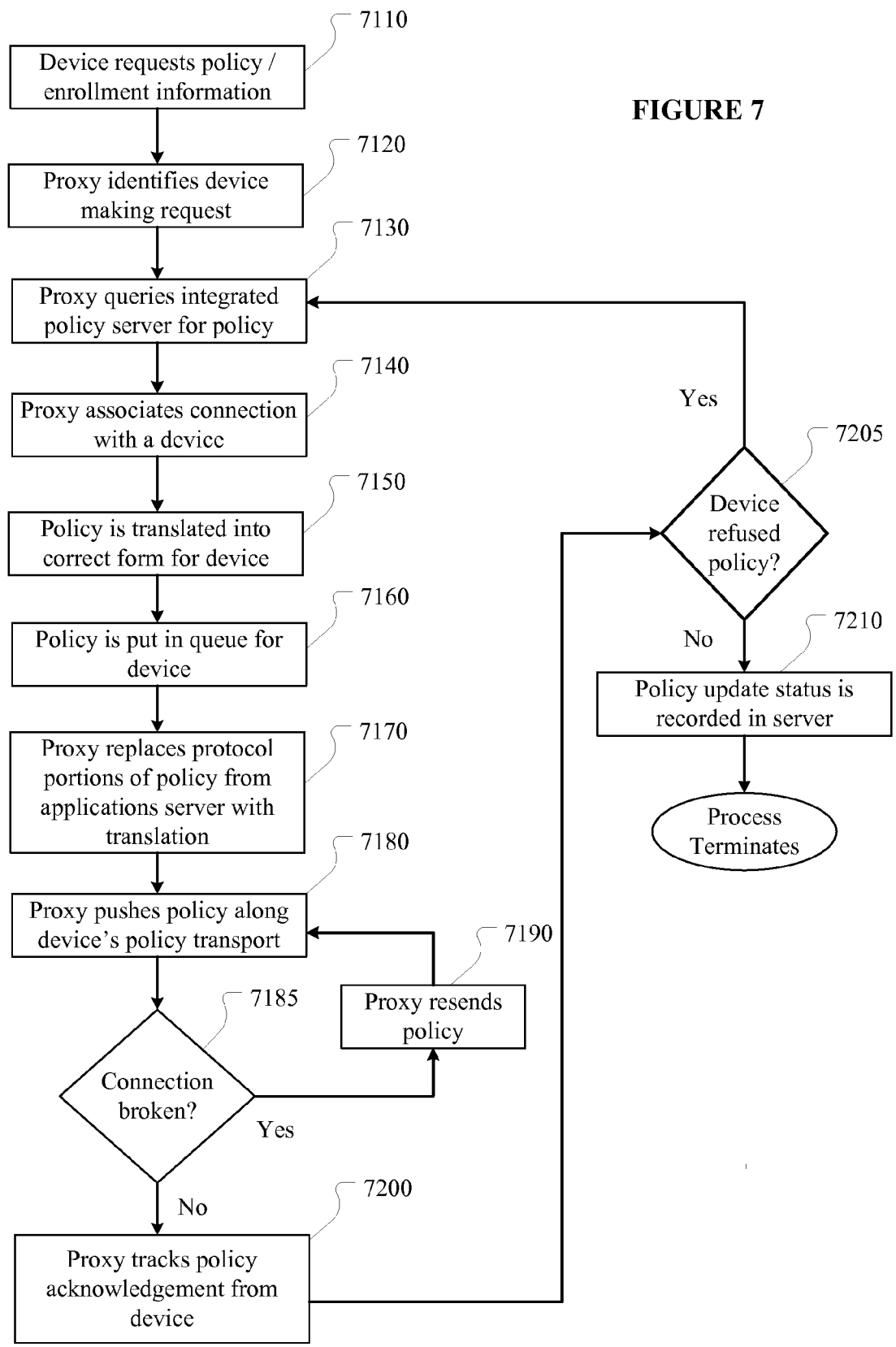
FIG. 7 illustrates a flowchart depicting sending a policy to a device on device query according to an embodiment of the invention.

Sending policy to device on device query takes several steps, as depicted in FIG. 7.

1. The device requests policy and/or enrollment information (7110)
2. The policy proxy identifies the device making the request (7120), and queries an policy integration server for an appropriate policy (7130). The policy proxy associates a connection with a device (7140) by inspecting the session (either from headers within the session or from client-certification authentication of the session itself).
3. The policy is translated into a form appropriate for that device (7150), and is put on a queue for that device (7160). This preferably occurs "on the fly", but can occur other ways as well. The policy translation is defined by one or more policy delivery rules.
4. The policy proxy replaces protocol portions associated with policy from the applications server with the translated policy (7170) and pushes the policy along the appropriate device's policy transport (e.g. EAS) (7180), and track acknowledgement of the policy from the device (7200).
5. The policy update status is recorded in the policy integration server (7210).
6. Policy processing errors may be handled at both the policy proxy (e.g., by resending the policy (7190) if a connection broke (7185)) or at the policy integration server (e.g., if a device refused a policy (7205)).

Policy Push

Figure 8:
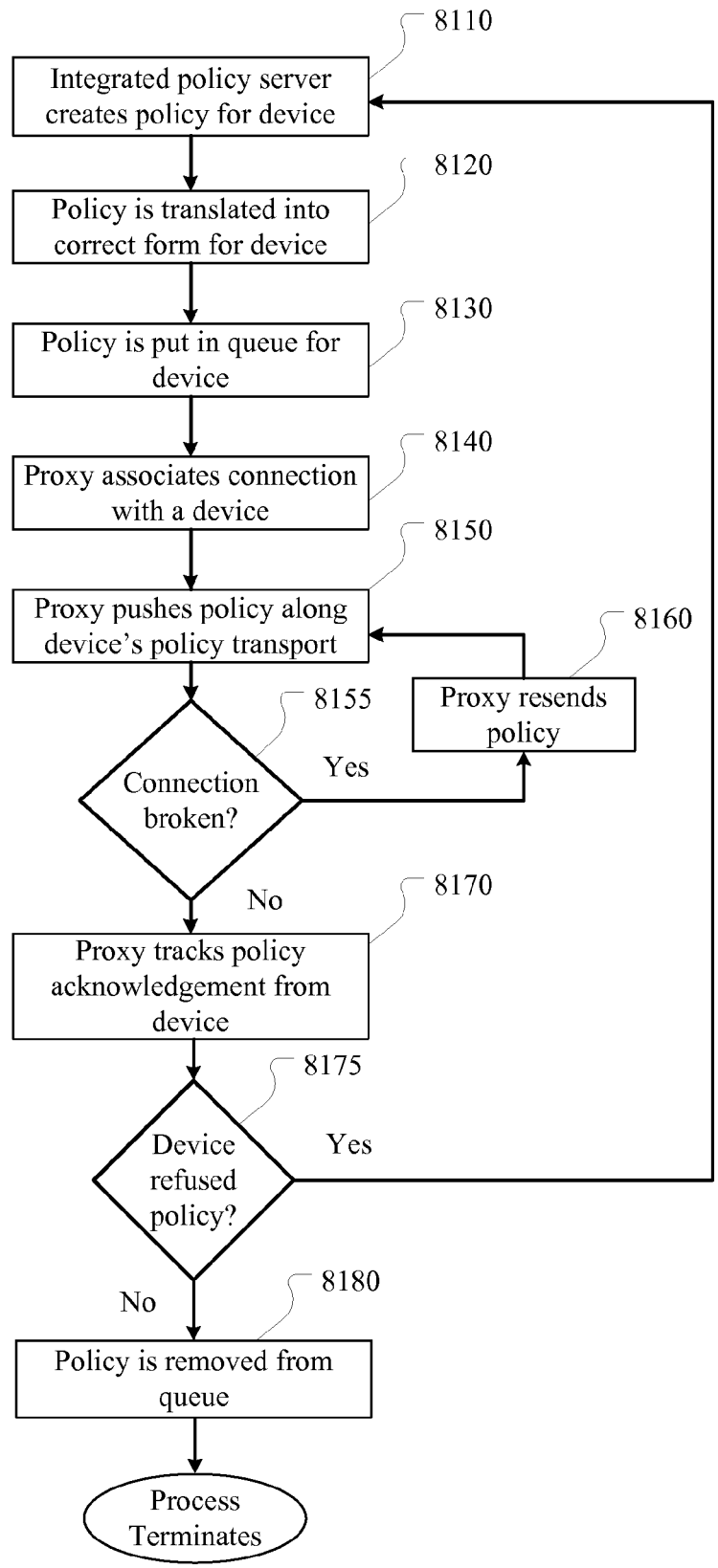
FIG. 8 is a flowchart depicting a policy push from the policy integration server according to an embodiment of the invention.

Policy push from the policy integration server has several steps, as depicted in FIG. 8:

1. The policy integration server creates policies for a specific device (8110), based on device, user, group, and other information.
2. The policy is translated into a form appropriate for that device (8120), and is put on a queue for that device (8130). This may occur prior to transmission or "on the fly".
3. The policy proxy and its components proxies connections for multiple devices. The policy proxy associates a connection with a device (8140) by inspecting the session (either from headers within the session or from client-certification authentication of the session itself). For each connection, the job of the policy proxy is to move policies from a device's policy queue on the policy integration server and push the policy along the appropriate device's policy transport (e.g. EAS) (8150), and track acknowledgment of the policy from the device (8170).
4. The policy is removed from the policy queue (8180) after the device acknowledges receipt of the pushed policy, preserving the transaction nature of policy processing.
5. Policy processing errors may be handled at both the policy proxy (e.g., by resending the policy (8160) if a connection broke (8155)) or at the policy integration server (e.g., if a device refused a policy (8175)).
6. If the policy information and/or compliance status is to be distributed to more than one policy server, the updated policy information and/or compliance status is distributed to each policy server on the basis of one or more policies.

Device-Side Extensions

In some additional embodiments, a client-side component can be added to provide additional functionality. While the following examples describe the functioning of an EAS proxy, the overall process is applicable to any policy server and/or content server. As described above, the EAS Proxy lives in front of the Microsoft™ Exchange Server, within the Enterprise DataCenter or remote to the Enterprise DataCenter (e.g., in a hosted implementation). A Device-side EAS Proxy is also useful. Such a proxy could live in front of the native Microsoft Exchange ActiveSync™ client on the mobile device (like a client-side EAS Firewall).

This EAS client proxy processes new commands passed to the device, before they are processed by the ActiveSync™ client. This allows, for example, new commands to "ride-the-EAS-rails" between the enterprise and the device, by using the Enterprise's EAS Proxy to inject new commands into the stream, and using the device-side EAS Proxy to strip them out for independent processing on the device, leaving the native EAS client with a native stream. The device-side EAS Proxy can also inject responses into the stream. These will typically be stripped out and interpreted by the policy proxy. The device-side proxy can also be used to protect the EAS client and device, by acting as an application firewall that ensures that the EAS stream is safe for the device to interpret.

The EAS client proxy can also provide enhanced functionality for existing commands above and beyond what Microsoft's ActiveSync™ provides, for example, a DOD-compliant Wipe, or GPS location-based synchronization.

Similar function can be achieved if the device's EAS client itself passes non-native EAS commands to another application on the device for processing, allowing these non-native commands to be processed after the EAS Client, instead of proxying the stream before it reaches the client. As an example, if the server-side EAS proxy injected OMA XML policies into the stream, the EAS client would pass those policies to the native operating system. When those policies were ingested, they would be enforced on the mobile device.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

Although the present invention has been described in relation to particular embodiments thereof, many other variations and modifications and other uses will become apparent to those skilled in the art. It is preferred therefore, that the present invention be limited not by the specific disclosure herein.

What is claimed is:

1. A method for controlling access to a data server by a mobile device, the mobile device having policy compliance capabilities, the method comprising:

receiving, by a policy proxy, a data stream between the data server and the mobile device;
identifying the mobile device;
identifying a policy in an integrated policy server applicable to the mobile device based on the identity of the mobile device; and
determining whether the mobile device is in compliance with the policy,
wherein when the mobile device is in compliance with the policy and the data stream includes a device settings query result, the method further comprises:
  adding the device settings query result to a group of one or more device settings query results, wherein the group of device settings query results is received in response to a device settings query from the data server, wherein the device settings query is translated into a form compatible with the mobile device and sent to the mobile device via a plurality of policy transports;
  translating the group of device settings query results into a form compatible with the data server; and
  sending the translated group of device settings query results to the data server,
wherein when the mobile device is not in compliance with the policy, the method further comprises:
  obtaining a common policy to apply to the mobile device;
  translating the common policy into at least first and second policy sets compatible with the mobile device; and
  sending the first policy set and the second policy set to the mobile device by a first policy transport and a second policy transport, respectively.

2. The method of claim 1, further comprising granting the mobile device access to the data server when the mobile device is in compliance with the policy when the data stream does not include a device settings query result.

3. The method of claim 1, further comprising denying the mobile device access to the data server when the mobile device is not in compliance with the policy.

4. The method of claim 1, wherein each of the first and second policy sets includes one or more policy elements and wherein, when the mobile device is not in compliance with the policy, the method further comprises:
  assigning the first and second policy sets to the first and second policy transports; and
  supplying the first and second policy sets to the first and second policy transports for transmission to the mobile device.

5. The method of claim 1, wherein compliance with the policy is determined by detecting the presence of one or more policy indicators in the mobile device, wherein when the mobile device is not in compliance with the policy, the method further comprises:
  adding a policy indicator to the first policy set before sending the first policy set to the mobile device by the first policy transport.

6. The method of claim 5, wherein the one or more policy indicators include one or more of a digital certificate, a device configuration setting, and a policy specification.

7. The method of claim 1, wherein compliance with the policy is determined by determining the presence of one or more device settings and comparing one or more of the device settings to one or more of the policy elements.

8. A system for controlling access to a data server by a mobile device, the mobile device having policy compliance capabilities, the system comprising:
  a data server;
  an integrated policy server;
  at least one processor device; and
  a policy proxy configured to interface with the at least one processor device to:
    receive a data stream between the data server and the mobile device;
    identify the mobile device;
    identify a policy in an integrated policy server applicable to the mobile device based on the identity of the mobile device; and
    determine whether the mobile device is in compliance with the policy,
    wherein when the mobile device is in compliance with the policy and the data stream includes a device settings query result, the policy proxy is further configured to:
      add the device settings query result to a group of one or more device settings query results, wherein the group of device settings query results is received in response to a device settings query from the data server, wherein the device settings query is translated into a form compatible with the mobile device and sent to the mobile device via a plurality of policy transports;
      translate the group of device settings query results into a form compatible with the data server; and
      send the translated group of device settings query results to the data server,
    wherein when the mobile device is not in compliance with the policy, the policy proxy is further configured to:
      obtain a common policy to apply to the mobile device;
      translate the common policy into at least first and second policy sets compatible with the mobile device; and
      send the first policy set and the second policy set to the mobile device by a first policy transport and a second policy transport, respectively.

9. The system of claim 8, wherein, when the mobile device is in compliance with the policy, the policy proxy is further configured to grant the mobile device access to the data server when the data stream does not include a device settings query result.

10. The system of claim 8, wherein, when the mobile device is not in compliance with the policy, the policy proxy is further configured to deny the mobile device access to the data server.

11. The system of claim 8, wherein each of the first and second policy sets includes one or more policy elements, and wherein, when the mobile device is not in compliance with the policy, the policy proxy is further configured to:
  assign the first and second policy sets to the first and second policy transports; and
  supply the first and second policy sets to the first and second policy transports for transmission to the mobile device.

12. The system of claim 8, wherein compliance with the policy is determined by detecting the presence of one or more policy indicators in the mobile device, wherein when the mobile device is not in compliance with the policy, the policy proxy is further configured to:
  add a policy indicator to the first policy set before sending the first policy set to the mobile device by the first policy transport.

13. The system of claim 12, wherein the one or more policy indicators include one or more of a digital certificate, a device configuration setting, and a policy specification.

14. The system of claim 8, wherein compliance with the policy is determined by determining the presence of one or more device settings and comparing one or more of the device settings to one or more of the policy elements.

15. A device for controlling access to a data server by a mobile device, the mobile device having policy compliance capabilities, the device comprising at least one processor device and a policy proxy configured to interface with the at least one processor device to:
receive a data stream between the data server and the mobile device;
identify the mobile device;
identify a policy in an integrated policy server applicable to the mobile device based on the identity of the mobile device; and
determine whether the mobile device is in compliance with the policy,
wherein when the mobile device is in compliance with the policy and the data stream includes a device settings query result, the policy proxy is further configured to:
add the device settings query result to a group of one or more device settings query results, wherein the group of device settings query results is received in response to a device settings query from the data server, wherein the device settings query is translated into a form compatible with the mobile device and sent to the mobile device via a plurality of policy transports;
translate the group of device settings query results into a form compatible with the data server; and
send the translated group of device settings query results to the data server,
wherein when the mobile device is not in compliance with the policy, the policy proxy is further configured to:
obtain a common policy to apply to the mobile device;
translate the common policy into at least first and second policy sets compatible with the mobile device; and
send the first policy set and the second policy set to the mobile device by a first policy transport and a second policy transport, respectively.

16. The device of claim 15, wherein, when the mobile device is in compliance with the policy, the policy proxy is further configured to grant the mobile device access to the data server when the data stream does not include a device settings query result.

17. The device of claim 15, wherein, when the mobile device is not in compliance with the policy, the policy proxy is further configured to deny the mobile device access to the data server.

18. The device of claim 15, wherein each of the first and second policy sets includes one or more policy elements, and wherein, when the mobile device is not in compliance with the policy, the policy proxy is further configured to:
assign the first and second policy sets to the first and second policy transports; and
supply the first and second policy sets to the first and second policy transports for transmission to the mobile device.

19. The device of claim 15, wherein compliance with the policy is determined by detecting the presence of one or more policy indicators in the mobile device, wherein when the mobile device is not in compliance with the policy, the policy proxy is further configured to:
add a policy indicator to the first policy set before sending the first policy set to the mobile device by the first policy transport.

20. The device of claim 19, wherein the one or more policy indicators include one or more of a digital certificate, a device configuration setting, and a policy specification.

21. The device of claim 15, wherein compliance with the policy is determined by determining the presence of one or more device settings and comparing one or more of the device settings to one or more of the policy elements.

\* \* \* \* \*

UNITED STATES PATENT AND TRADEMARK OFFICE
CERTIFICATE OF CORRECTION

| | | |
|---|---|---|
| PATENT NO. | : 8,572,676 B2 | Page 1 of 2 |
| APPLICATION NO. | : 12/614333 | |
| DATED | : October 29, 2013 | |
| INVENTOR(S) | : Kevin Sapp et al. | |

It is certified that error appears in the above-identified patent and that said Letters Patent is hereby corrected as shown below:

On the title page, item (54), and in the specification, column 1, line 1, in "Title", delete "METHOD," and insert -- METHOD --, therefor.

In the Drawings:

On sheet 3 of 10, in Figure 3A, Reference Numeral 3100, line 2, delete "Scrvcr" and insert -- Server --, therefor.

On sheet 4 of 10, in Figure 3B, Reference Numeral 3410, line 2, delete "Updatc" and insert -- Update --, therefor.

On sheet 4 of 10, in Figure 3B, Reference Numeral 3440, line 2, delete "Wipc for Mobilc" and insert -- Wipe for Mobile --, therefor.

On sheet 4 of 10, in Figure 3B, Reference Numeral 3450, line 1, delete "Sclcct" and insert -- Select --, therefor.

On sheet 5 of 10, in Figure 3C, Reference Numeral 3225, line 2, delete "Scqucncc" and insert -- Sequence --, therefor.

On sheet 5 of 10, in Figure 3C, Reference Numeral 3240, line 1, delete "Qucucd" and insert -- Queued --, therefor.

On sheet 5 of 10, in Figure 3C, Reference Numeral 3260, line 1, delete "Qucry" and insert -- Query --, therefor.

On sheet 5 of 10, in Figure 3C, Reference Numeral 3263, line 1, delete "Scnd" and insert -- Send --, therefor.

Signed and Sealed this
Eighteenth Day of March, 2014

Michelle K. Lee
*Deputy Director of the United States Patent and Trademark Office*

CERTIFICATE OF CORRECTION (continued)
U.S. Pat. No. 8,572,676 B2

On sheet 8 of 10, in Figure 6, Reference Numeral 6110, line 1, delete "Mobilc" and insert -- Mobile --, therefor.

On sheet 8 of 10, in Figure 6, Reference Numeral 6120, line 2, delete "Dcvicc" and insert -- Device --, therefor.

On sheet 9 of 10, in Figure 7, Reference Numeral 7140, line 2, delete "Dcvicc" and insert -- Device --, therefor.